(12) United States Patent
Coldren et al.

(10) Patent No.: US 9,856,835 B1
(45) Date of Patent: Jan. 2, 2018

(54) FUEL SUPPLY SYSTEM FOR AN ENGINE WITH AN ELECTRIC IGNITION POWER SOURCE

(71) Applicant: Caterpillar Inc., Peoria, IL (US)

(72) Inventors: Dana Coldren, Secor, IL (US); Glenn Cox, Peoria, IL (US); David Ginter, Commerce Township, MI (US); Alan Stockner, Metamora, IL (US); Martin Willi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/201,381

(22) Filed: Jul. 1, 2016

(51) Int. Cl.
*F02M 37/00* (2006.01)
*F02M 21/02* (2006.01)
(Continued)

(52) U.S. Cl.
CPC ....... *F02M 37/0064* (2013.01); *F02B 17/005* (2013.01); *F02B 19/108* (2013.01); *F02D 41/30* (2013.01); *F02F 1/00* (2013.01); *F02F 3/00* (2013.01); *F02M 21/0218* (2013.01); *F02M 21/0245* (2013.01); *F02M 21/0284* (2013.01);
(Continued)

(58) Field of Classification Search
CPC .. F02D 41/0025; F02D 41/30; F02D 41/3094; F02D 41/38; F02M 21/0287; F02M 21/0284; F02M 21/0278; F02M 21/0215; F02M 21/0245; F02M 21/02; F02M 21/0203; F02M 21/0218; F02M 21/0221; F02M 21/023; F02M 21/0239; F02M 37/0064; F02M 37/0076; F02M 37/0088; F02M 37/0094; F02M 39/005; F02M 39/02; F02M 59/464; F02M 69/046; E02F 9/0275; E02F 9/2246; F02B 17/005; F02B 19/108
See application file for complete search history.

(56) References Cited

U.S. PATENT DOCUMENTS 5,375,580 A * 12/1994 Stolz ................... F02B 29/0443
123/527
5,555,868 A 9/1996 Neumann
(Continued)

FOREIGN PATENT DOCUMENTS

JP 3756995 3/2006
WO WO2015074148 5/2015

*Primary Examiner* — Lindsay Low
*Assistant Examiner* — George Jin
(74) *Attorney, Agent, or Firm* — Claim Construction PLLC

(57) ABSTRACT

A fuel supply system for a reciprocating-piston engine includes a storage tank; a wall of the storage tank defining a first aperture and a second aperture therethrough; a first fuel injector fluidly coupled with the first aperture of the storage tank via a pressure control module and a first fuel injector supply conduit; a pump fluidly coupled with the second aperture of the storage tank; and a second fuel injector fluidly coupled with an outlet port of the pump via a second fuel injector supply conduit. The pressure control module is configured to maintain a pressure in the first fuel injector supply conduit within a pressure range that includes a pressure value that is less than a pressure inside the storage tank. The pump is configured to maintain a pressure inside the second fuel injector supply conduit that is greater than the pressure inside the first fuel injector supply conduit.

20 Claims, 7 Drawing Sheets

(51) Int. Cl.
*F02D 41/30* (2006.01)
*F02M 39/00* (2006.01)
*F02F 1/00* (2006.01)
*F02F 3/00* (2006.01)
*F02M 39/02* (2006.01)
*F02M 59/46* (2006.01)
*F02M 69/04* (2006.01)
*F02B 17/00* (2006.01)
*F02B 19/10* (2006.01)

(52) U.S. Cl.
CPC ...... *F02M 37/0076* (2013.01); *F02M 39/005* (2013.01); *F02M 39/02* (2013.01); *F02M 59/464* (2013.01); *F02M 69/046* (2013.01)

(56) References Cited

U.S. PATENT DOCUMENTS

| | | |
|---|---|---|
| 6,128,908 A | 10/2000 | Gustafson |
| 6,640,556 B2 | 11/2003 | Ursan et al. |
| 7,159,568 B1 | 1/2007 | Lewis et al. |
| 8,215,284 B2 | 7/2012 | Suzuki et al. |
| 8,555,852 B2 | 10/2013 | Munshi et al. |
| 8,925,518 B1 | 1/2015 | Riley et al. |
| 2003/0221433 A1* | 12/2003 | Gustafson ................. F17C 5/06 62/48.1 |
| 2011/0314839 A1* | 12/2011 | Brook .................... F02M 21/06 62/49.1 |
| 2012/0103302 A1 | 5/2012 | Attard |
| 2014/0114552 A1 | 4/2014 | Cherniak et al. |
| 2014/0172269 A1* | 6/2014 | Perry ................. F02D 41/0025 701/102 |
| 2014/0196686 A1 | 7/2014 | Coldren et al. |
| 2014/0216066 A1 | 8/2014 | Snyder et al. |
| 2015/0184617 A1* | 7/2015 | Kim .................. F02M 21/0245 123/472 |
| 2016/0017824 A1 | 1/2016 | Touchette et al. |
| 2016/0312750 A1* | 10/2016 | Fekete .................... F02D 19/10 |

\* cited by examiner

FUEL SUPPLY SYSTEM FOR AN ENGINE WITH AN ELECTRIC IGNITION POWER SOURCE

TECHNICAL FIELD

The present disclosure relates generally to reciprocating-piston internal combustion engines and, more particularly, to a fuel system for a reciprocating-piston internal combustion engine that draws fuel from a storage tank in both a gaseous phase and a liquid phase.

BACKGROUND

Reciprocating-piston internal combustion (IC) engines are known for converting chemical energy from a fuel supply into mechanical shaft power. A fuel-oxidizer mixture is received in a variable volume of an IC engine defined by a piston translating within a cylinder bore. The fuel-oxidizer mixture burns inside the variable volume to convert chemical energy from the mixture into heat. In turn, expansion of the combustion products within the variable volume performs work on the piston, which may be transferred to an output shaft of the IC engine.

Some constituents in the exhaust stream from an IC engine, such as, for example, nitrogen oxides (NOx), unburned hydrocarbons (UHCs), and particulate matter (PM), may be subject to government regulations. Accordingly, operators may wish to control concentrations of regulated exhaust constituents released to the environment. The composition of exhaust discharged from an IC engine may be affected by control of the combustion process within the variable volume combustion chamber, exhaust aftertreatment downstream of the combustion chamber, or combinations thereof.

Some IC engines employ an externally-powered ignition source to initiate combustion of the fuel-oxidizer mixture within the variable volume. For example, an IC engine may include a spark plug defining a spark gap between an anode and a cathode, where the spark gap is in fluid communication with the variable volume and in electrical communication with an electric potential. Accordingly, applying the electric potential across the spark gap may cause an electric spark to arc across the spark gap, thereby initiating combustion of the fuel-oxidizer mixture within the variable volume.

U.S. Pat. No. 8,215,284 (hereinafter "the '284 patent"), entitled "Micro-Pilot Injection Ignition Type Gas Engine," purports to address the problem of starting a dual gaseous and liquid fueled engine. The '284 patent describes a micro-pilot injection ignition type gas engine and an air-fuel ratio control method thereof. According to the '284 patent gaseous fuel and air are mixed upstream of an intake valve, and the mixture of air and gaseous fuel are admitted into a combustion chamber during an intake stroke, while the intake valve is open. During a subsequent compression stroke, a portion of the mixture of air and gaseous fuel flow into a pre-chamber via at least one pre-chamber nozzle hole.

Next according to the '284 patent, a fuel oil injector injects a small amount of fuel oil into the pre-chamber, and a mixture of the fuel oil injection and air autoignites within the pre-chamber. Autoignition of the fuel oil-air mixture within the pre-chamber further ignites the mixture of air and gaseous fuel within the pre-chamber, thereby causing hot combustion products within the pre-chamber to jet out through the at least one pre-chamber nozzle hole into the combustion chamber. In turn, the jets of combustion products from the pre-chamber ignite the mixture of air and gaseous fuel within the combustion chamber.

However, the ignition strategy described in the '284 patent requires that two different types of fuel, namely a gaseous fuel and a liquid fuel oil, be available to the engine, which may cause logistical challenges in providing two different fuel types to the engine, as well as operational challenges in balancing consumption of the two different fuel types as not to prematurely deplete one of the two fuel types. Accordingly, there is a need for improved gaseous fuel combustion systems for internal combustion engines to address the aforementioned challenges and/or other problems in the art.

It will be appreciated that this background description has been created to aid the reader, and is not a concession that any of the indicated problems were themselves known previously in the art.

SUMMARY

According to an aspect of the disclosure, a fuel supply system for a reciprocating-piston engine comprises a storage tank, a wall of the storage tank defining a first aperture and a second aperture therethrough, the first aperture being distinct from the second aperture; a first fuel injector fluidly coupled with the first aperture of the storage tank via a pressure control module and a first fuel injector supply conduit, the first fuel injector supply conduit being disposed fluidly in series between the pressure control module and first fuel injector, the pressure control module being configured to maintain a pressure in the first fuel injector supply conduit within a pressure range that includes a pressure value that is less than a pressure inside the storage tank; a pump fluidly coupled with the second aperture of the storage tank; and a second fuel injector fluidly coupled with an outlet port of the pump via a second fuel injector supply conduit, the pump being configured to maintain a pressure inside the second fuel injector supply conduit that is greater than the pressure inside the first fuel injector supply conduit.

According to another aspect of the disclosure, an engine comprises a block defining a cylinder bore therethrough; a piston disposed within the cylinder bore and configured for reciprocating motion relative to the cylinder bore, the cylinder bore and the piston at least partly defining a main combustion chamber; an oxidizer intake conduit disposed in selective fluid communication with the main combustion chamber via an intake valve; an intake fuel injector having at least one outlet orifice disposed in fluid communication with the main combustion chamber via the oxidizer intake conduit; a direct fuel injector having at least one outlet orifice disposed in direct fluid communication with the main combustion chamber along a flow path that does not include the oxidizer intake conduit; a storage tank, a wall of the storage tank defining a first aperture and a second aperture therethrough, the first aperture being distinct from the second aperture, the first aperture of the storage tank being fluidly coupled to an inlet of the intake fuel injector via a pressure control module, the pressure control module being configured to maintain a pressure at the inlet of the intake fuel injector within a pressure range that includes a pressure value that is less than a pressure inside the storage tank; a pump fluidly coupled with the second aperture of the storage tank, an inlet of the direct fuel injector being fluidly coupled to an outlet of the pump, the pump being configured to maintain a pressure at the inlet of the direct fuel injector that is greater than the pressure at the inlet of the intake fuel injector.

Another aspect of the disclosure provides a method for supplying a fuel to an engine. The method comprises drawing a first flow of the fuel from a storage tank, the first flow of the fuel leaving the storage tank in a gaseous state; delivering the first flow of the fuel from the storage tank to a first fuel injector via a pressure control module; decreasing a pressure of the first flow of the fuel to less than a pressure inside the storage tank via the pressure control module; injecting the first flow of the fuel into a main combustion chamber of the engine via an oxidizer intake conduit of the engine; drawing a second flow of the fuel from the storage tank, the second flow of the fuel leaving the storage tank in a liquid state, the gaseous state of the fuel coexisting with the liquid state of the fuel within the storage tank; pumping the second flow of the fuel to a pressure that is higher than a pressure inside the storage tank; delivering the second flow of the fuel to a second fuel injector at a pressure that is higher than the pressure of the first flow of the fuel within the first fuel injector; and injecting the second flow of the fuel directly into the main combustion chamber of the engine via the second fuel injector.

DETAILED DESCRIPTION

Aspects of the disclosure will now be described in detail with reference to the drawings, wherein like reference numbers refer to like elements throughout, unless specified otherwise.

Figure 1:
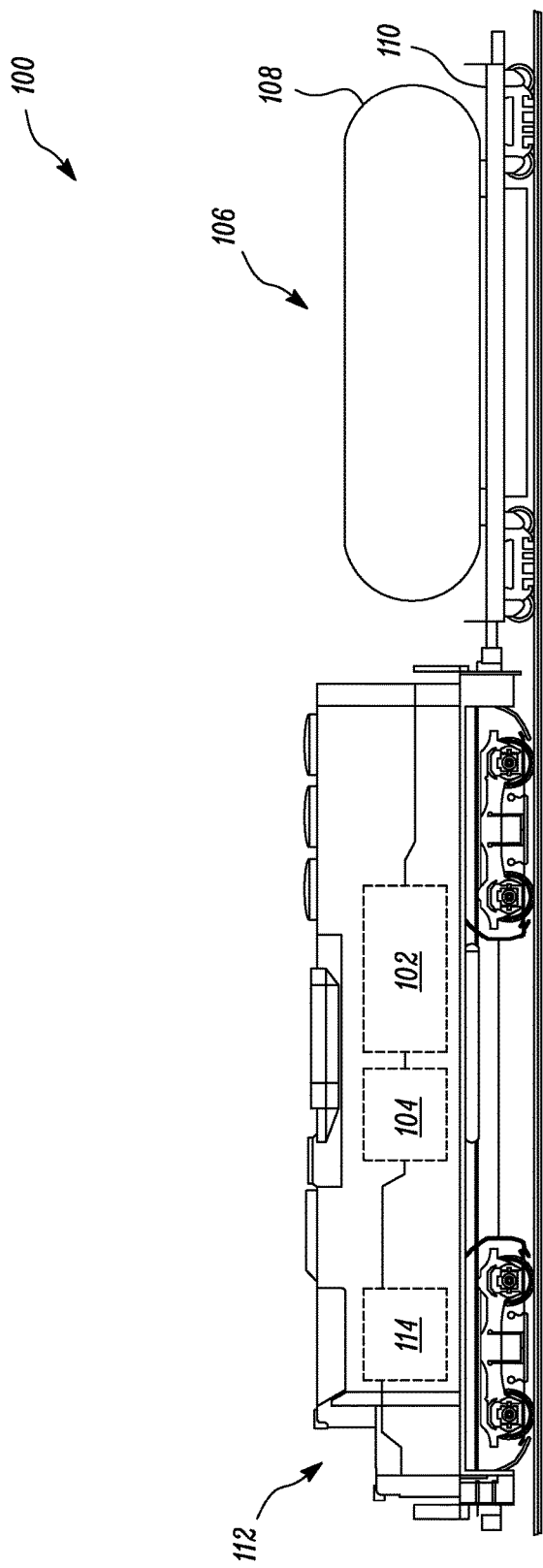
FIG. 1 is a side view of a machine, according to an aspect of the disclosure.

FIG. 1 is a side view of a machine 100, according to an aspect of the disclosure. The machine 100 can be a railroad vehicle, an over-the-road vehicle such as a truck used in transportation, an off-road vehicle, or may be any other type of machine that performs an operation associated with an industry such as mining, construction, farming, transportation, or any other industry known in the art. For example, the machine 100 may be an off-highway truck, a railroad locomotive, an earth-moving machine, such as a wheel loader, an excavator, a dump truck, a backhoe, a motor grader, a material handler, or the like. The term "machine" can also refer to stationary equipment that includes an internal combustion engine to provide shaft power to a load, such as an electric generator, a pump, or a compressor, for example. The specific machine 100 illustrated in FIG. 1 is a railroad locomotive.

The machine 100 includes an internal combustion (IC) engine 102 operatively coupled to a controller 104. The IC engine 102 may be a reciprocating-piston IC engine, such as a compression ignition engine or a spark ignition engine, a turbomachine such as a gas turbine, combinations thereof, or any other internal combustion engine known in the art.

The IC engine 102 may receive fuel from one or more fuel supply systems 106, including, but not limited to, a liquid fuel supply system, a gaseous fuel supply system, or combinations thereof. Liquid fuel provided by a liquid fuel supply system may include distillate diesel, biodiesel, dimethyl ether, seed oils, gasoline, ethanol, liquefied petroleum gas (LPG), liquefied natural gas (LNG), combinations thereof, or any other combustible liquid fuel known in the art. Gaseous fuel provided by a gaseous fuel supply system may include gaseous propane, hydrogen, methane, ethane, butane, natural gas, combinations thereof, or any other combustible gaseous fuel known in the art. The IC engine 102 may be configured to simultaneously burn mixtures of fuel from two or more fuel supply systems 106 with an oxidizer.

According to an aspect of the disclosure, the fuel supply system 106 is configured to deliver natural gas. According to another aspect of the disclosure, the fuel supply system 106 is configured to deliver a combustible gas comprising at least 50% methane by mole. According to yet another aspect of the disclosure, the low-pressure fuel system 120 is configured to deliver a fuel with a sufficiently low cetane value, or a sufficiently high octane value, for use in a spark-ignition reciprocating IC engine, such as natural gas, for example.

It will be appreciated that some fuels, such as LNG, may be stored in a liquid state and supplied to the engine 102 in a liquid state, a gaseous state, or combinations thereof. It will be further appreciated that some liquid fuels may be stored at cryogenic temperatures that are much lower than an ambient temperature of the machine 100. According to an aspect of the disclosure, cryogenic temperatures are temperatures that are less than about −200 degrees Fahrenheit.

The fuel supply system 106 includes a fuel storage tank 108 that is fluidly coupled to the IC engine 102 via one or more fluid conditioning elements of the fuel supply system 106. The fluid conditioning elements of the fuel supply system 106 may include a pump, a filter, a heat exchanger, sensors, control valves, actuators, accumulators, regulators, check valves, combinations thereof, or any other structures known to benefit the conditioning of fuel for the IC engine 102. The fuel supply system 106 may also be operatively coupled to the controller 104 for control thereof.

Although the specific fuel supply system 106 illustrated in FIG. 1 is at least partly supported or carried by a railroad tender car 110, it will be appreciated that the fuel supply system 106 may be incorporated into other machines in other ways depending on the needs of the particular application.

The machine 100 may include an operator cab 112 that includes one or more control input devices 114 that are operatively coupled to the controller 104. The control input devices 114 may include manual control input devices configured to communicate manual control inputs from an operator in the cab 112 to the controller 104; automatic control input devices such as open-loop controllers, closed-loop controllers, or programmable logic controllers, for example; remote control input devices such as wired or wireless telemetry devices; displays; combinations thereof; or any other control input device known in the art.

Figure 2:
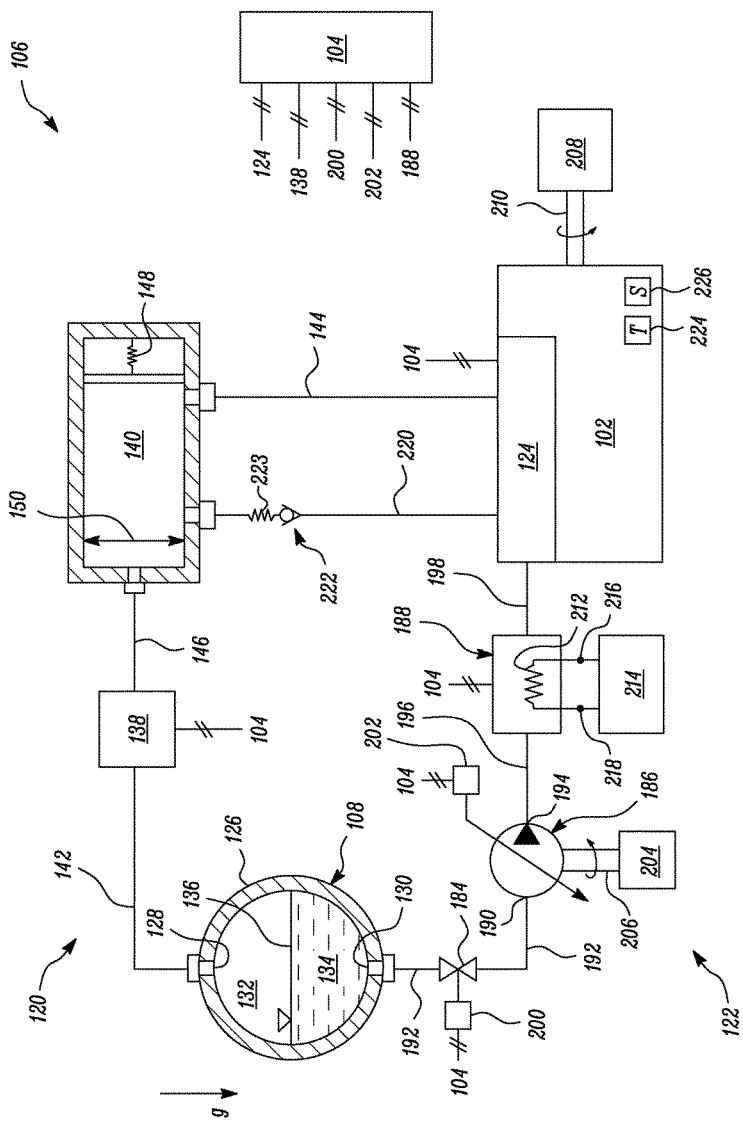
FIG. 2 is a schematic view of a fuel supply system, according to an aspect of the disclosure.

FIG. 2 shows a fuel supply system 106, according to an aspect of the disclosure. According to the fuel supply system 106 illustrated in FIG. 2, a fuel injection system 124 of an IC engine 102 is fluidly coupled with a fuel storage tank 108 via two parallel flow paths, namely a low-pressure fuel system 120 and a high-pressure fuel system 122.

The fuel storage tank 108 may be configured to simultaneously store a gaseous phase 132 of a fuel and a liquid phase 134 of a fuel, where the gaseous phase 132 of the fuel is separated from the liquid phase 134 of the fuel by a free surface 136. Thus, the gaseous phase 132 of the fuel is in contact with the liquid phase 134 of the fuel at the free surface 136. It will be appreciated that a quantity of the gaseous-phase 132 fuel relative to the liquid-phase 134 fuel within the fuel storage tank 108 may shift in response to changes in tank internal pressure, tank internal temperature, mass transfer into or out of the fuel storage tank 108, or combinations thereof.

According to an aspect of the disclosure, the fuel storage tank 108 is the only source of fuel in the fuel supply system 106. However, it will be appreciated that a plurality of discreet tanks that are fluidly coupled to one another via connecting conduits are contemplated to be within the scope of the fuel storage tank 108, according to aspects of the present disclosure. According to another aspect of the disclosure, the fuel storage tank 108 may be a single discreet tank and the only storage tank in the fuel supply system 106.

According to an aspect of the disclosure, the fuel storage tank 108 is configured to store fuel at a pressure that is greater than an ambient or atmospheric pressure surrounding the fuel supply system 106. According to another aspect of the disclosure, the fuel storage tank 108 is configured to cryogenically store LNG at a tank internal pressure greater than 20 psig and a tank internal temperature less than –200 degrees Fahrenheit. The controller 104 may be configured to sense a temperature, a pressure, or both, within the fuel storage tank 108 and take control action to vary the temperature or pressure within the fuel storage tank 108.

The fuel storage tank 108 includes a wall 126 that defines a first aperture 128 and a second aperture 130 therethrough. The first aperture 128 may be located on the fuel storage tank 108 such that an elevation of the first aperture 128 is higher than an elevation of the free surface 136 along the gravity direction g; and the second aperture 130 may be located on the fuel storage tank 108 such that an elevation of the second aperture 130 is lower than an elevation of the free surface 136 along the gravity direction g. Accordingly, the first aperture 128 may be configured and arranged to be in direct fluid communication with the gaseous phase 132 of the fuel along a path that does not include the liquid phase 134 of the fuel; and the second aperture 130 may be configured and arranged to be in direct fluid communication with the liquid phase 134 of the fuel along a path that does not include the gaseous phase 132 of the fuel.

The low-pressure fuel system 120 may include a pressure control module 138, an accumulator 140, or both. The pressure control module 138 is fluidly coupled to the first aperture 128 of the fuel storage tank 108 via a first low-pressure conduit 142, and is fluidly coupled to the fuel injection system 124 of the IC engine 102 via a second low-pressure conduit 144. Accordingly, the pressure control module 138 is disposed in series fluid communication between the fuel storage tank 108 and the IC engine 102.

The pressure control module 138 may be fluidly coupled to the accumulator 140 via a third low-pressure conduit 146, and the accumulator 140 may be fluidly coupled to the fuel injection system 124 of the IC engine 102 via the second low-pressure conduit 144. Accordingly, the pressure control module 138 may be fluidly coupled to the IC engine 102 via the accumulator 140, such that the accumulator 140 is disposed fluidly in series between pressure control module 138 and the IC engine 102.

The accumulator 140 is configured to store fluid energy from the low-pressure fuel system 120 in the form of fluid pressure, impart fluid energy to the low-pressure fuel system 120 in the form of fluid pressure, damp pressure oscillations within the low-pressure fuel system 120, perform combinations thereof, or perform any other fluid accumulator function known in the art. The accumulator 140 includes a resilient element 148 that is configured to store fluid energy when fluid within the accumulator 140 performs work on the resilient element 148, and that is configured to release fluid energy when the resilient element 148 performs work on fluid within the accumulator 140. The resilient element 148 may be a coil spring, a leaf spring, a diaphragm, a volume of compressible fluid, combinations thereof, or any other accumulator resilient element known in the art. When the resilient element 148 is a volume of compressible fluid, the compressible fluid may be the fluid received from and in fluid communication with the first aperture 128 of the fuel storage tank 108, a fluid that is different from and sealed separate from the fluid received from the first aperture 128 of the fuel storage tank 108, or combinations thereof.

According to an aspect of the disclosure, a volume of compressible fluid within the accumulator 140 is not less than ten times a volume contained within the second low-pressure conduit 144. Alternatively or additionally, a transverse internal dimension 150 of the accumulator 140 is not less than four times a transverse internal dimension of the second low-pressure conduit 144. According to another aspect of the disclosure, the transverse internal dimension 150 of the accumulator 140 is larger than a transverse internal dimension of the third low-pressure conduit 146, the second low-pressure conduit 144, or both. As used herein, a "transverse internal dimension" of a vessel will be understood to be an internal dimension that is transverse to a bulk flow direction through that vessel. Thus, a transverse internal dimension of the third low-pressure conduit 146 may be an internal diameter of the third low-pressure conduit 146, and a transverse internal dimension of the second low-pressure conduit 144 may be an internal diameter of the second low-pressure conduit 144, for example.

According to another aspect of the disclosure, the low-pressure fuel system 120 does not include an accumulator that is distinct from either the third low-pressure conduit 146 or the second low-pressure conduit 144. Accordingly, the third low-pressure conduit 146 may be directly fluidly coupled to the second low-pressure conduit 144 without a distinct accumulator 140 disposed fluidly in series therebetween.

Referring still to FIG. 2, the pressure control module 138 may be configured to control a fluid pressure delivered to the accumulator 140, the fuel injection system 124, or both, via the third low-pressure conduit 146. According to an aspect of the disclosure, the pressure control module 138 is configured to maintain a pressure within the accumulator 140, the fuel injection system 124, or both, to be not less than a pressure ($P\_t$) within the fuel storage tank 108 minus a first pressure differential ($\Delta P1$). Alternatively or additionally, the pressure control module 138 is configured to maintain a pressure within the accumulator 140, the fuel injection system 124, or both, to be not greater than the pressure ($P\_t$) within the fuel storage tank 108 plus a second pressure differential ($\Delta P2$). It will be understood that the tank pressure (P_t) minus the first pressure differential (ΔP1) is greater than an ambient or atmospheric pressure surrounding the fuel storage tank 108.

According to an aspect of the disclosure, the first pressure differential (ΔP1) is substantially equal to the second pressure differential (ΔP2), in that a difference between the first pressure differential (ΔP1) and the second pressure differential (ΔP2) is less than 1% of the pressure (P_t) within the fuel storage tank 108. According to another aspect of the disclosure, the first pressure differential (ΔP1) is greater than the second pressure differential (ΔP2). According to yet another aspect of the disclosure, the second pressure differential (ΔP2) is substantially zero, which may include small pressure differentials that are less than 1% of the pressure (P_t) within the fuel storage tank 108.

Figures 3, 4:
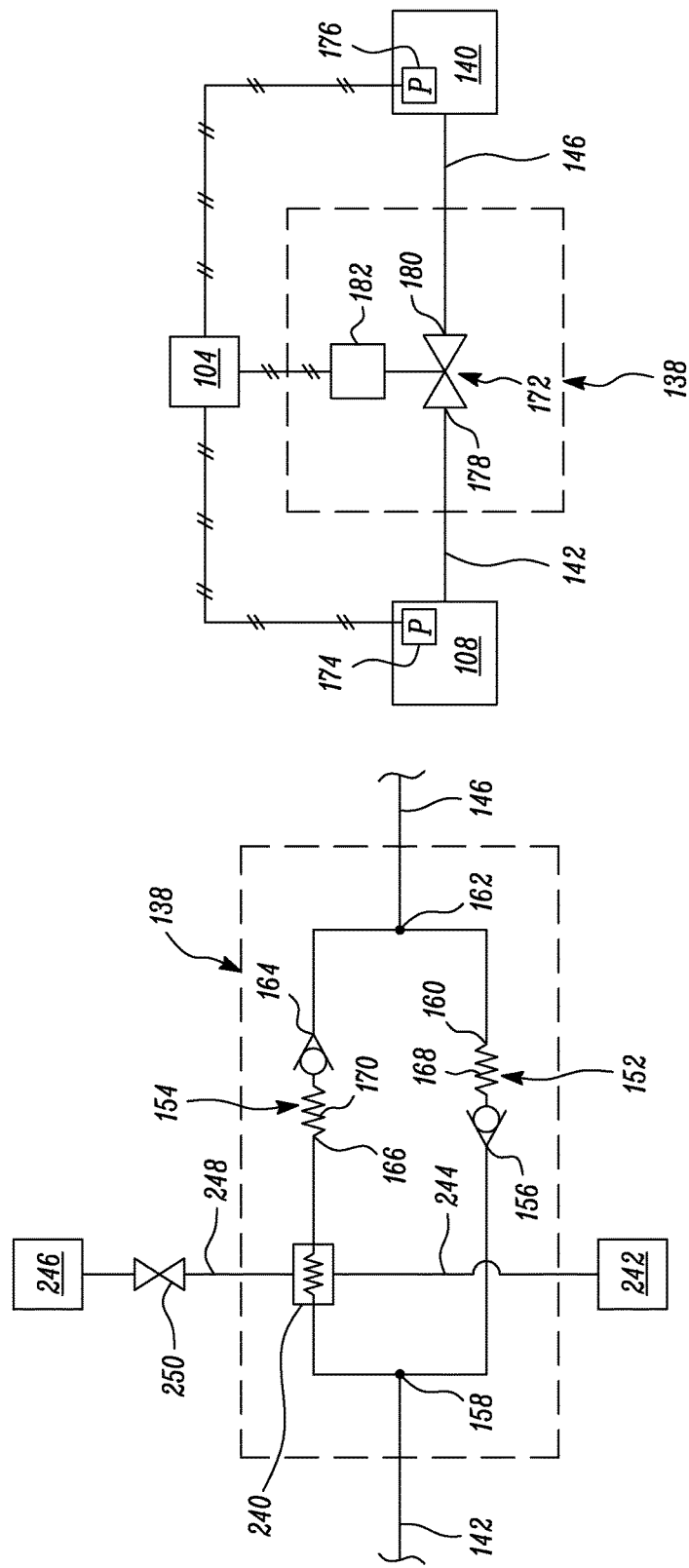
FIG. 3 is a schematic view of a pressure control module, according to an aspect of the disclosure.
FIG. 4 is a schematic view of a pressure control module, according to an aspect of the disclosure.

FIG. 3 is a schematic view of a pressure control module 138, according to an aspect of the disclosure. The pressure control module 138 in FIG. 3 includes a supply check valve 152 and a relief check valve 154. An inlet 156 of the supply check valve 152 may be fluidly coupled to the first low-pressure conduit 142 via a fluid node 158, and an outlet 160 of the supply check valve 152 may be fluidly coupled to the third low-pressure conduit 146 via a fluid node 162. An inlet 164 of the relief check valve 154 may be fluidly coupled to the third low-pressure conduit 146 via the fluid node 162, and the outlet 166 of the relief check valve 154 may be fluidly coupled to the fluid node 158.

Accordingly, the first low-pressure conduit 142 may be fluidly coupled to the third low-pressure conduit 146 via the supply check valve 152, and the first low-pressure conduit 142 may be fluidly coupled to the third low-pressure conduit 146 via the relief check valve 154. Furthermore, the supply check valve 152 and the relief check valve 154 may be fluidly coupled with one another in parallel via the fluid nodes 158, 162.

The supply check valve 152 is configured and arranged to allow flow therethrough only in a direction from the first low-pressure conduit 142 toward the third low-pressure conduit 146, and the relief check valve 154 is configured and arranged to allow flow therethrough only in a direction from the third low-pressure conduit 146 toward the first low-pressure conduit 142. The supply check valve 152 may include a resilient member 168 that maintains the supply check valve 152 in a closed position until a pressure at the outlet 160 falls below a pressure at the inlet 156 by the first pressure differential (ΔP1). Similarly, the relief check valve 154 may include a resilient member 170 that maintains the relief check valve 154 in a closed position until a pressure at the inlet 164 exceeds a pressure at the outlet 166 by the second pressure differential (ΔP2).

Accordingly, supply check valve 152 may convey fluid from the fuel storage tank 108 to the third low-pressure conduit 146 when the pressure in the third low-pressure conduit 146 falls below a target minimum pressure relative to a pressure in the fuel storage tank 108. Similarly, the relief check valve 154 may convey fluid from the third low-pressure conduit 146 to the fuel storage tank 108 when the pressure in the third low-pressure conduit 146 rises above a target maximum pressure relative to a pressure in the fuel storage tank 108. According to an aspect of the disclosure, the pressure control module 138 is self-contained and free from operative coupling with the controller 104.

Optionally, a heat exchanger 240 may be disposed fluidly in series between the outlet 166 of the relief check valve 154 and the fuel storage tank 108. Further, the heat exchanger 240 may be disposed in fluid communication with a cooling fluid source 242 via a coolant source conduit 244 and a cooling fluid sink 246 via a coolant discharge conduit 248. In turn, the heat exchanger 240 may effect thermal communication between a flow of fluid from the relief check valve 154 to the fuel storage tank 108, and a flow of fluid from the cooling fluid source 242 to the cooling fluid sink 246.

The coolant discharge conduit 248 may include a flow restricting orifice 250 such as a variable-geometry valve or a fixed-geometry orifice, for example, to limit a flow of cooling fluid from the cooling fluid source 242 to the cooling fluid sink 246. According to an aspect of the disclosure, a flow area through the flow restricting orifice 250 is less than half of a flow area through the coolant source conduit 244, the coolant discharge conduit 248, or both.

The cooling fluid source 242 may be a source of liquid cryogenic fuel taken from the high-pressure fuel system 122 between the outlet 194 of the pump 186 and the fuel conditioning module 188, inclusive. The cooling fluid sink 246 may be the fuel storage tank 108, the first high-pressure conduit 192 between the fuel storage tank 108 and the inlet 190 of the pump 186, or combinations thereof, for example.

FIG. 4 is a schematic view of a pressure control module 138, according to an aspect of the disclosure. The pressure control module 138 in FIG. 4 includes a control valve 172, a first pressure sensor 174, and a second pressure sensor 176. A first port 178 of the control valve 172 is fluidly coupled to the first low-pressure conduit 142, and a second port 180 of the control valve 172 is fluidly coupled to the third low-pressure conduit 146. Accordingly, the control valve 172 may effect selective fluid communication between the fuel storage tank 108 and the fuel injection system 124 of the IC engine 102 (see FIG. 2).

The first pressure sensor 174 is shown arranged to measure a pressure within the fuel storage tank 108. However, it will be appreciated that the first pressure sensor 174 may be arranged to measure a pressure anywhere along the flow path between the fuel storage tank 108 and the control valve 172. The second pressure sensor 176 is shown arranged to measure a pressure within the accumulator 140. However, it will be appreciated that the second pressure sensor 176 may be arranged to measure a pressure anywhere along the flow path between the control valve 172 and the fuel injection system 124 (see FIG. 2).

The control valve 172, the first pressure sensor 174, and the second pressure sensor 176 may be operatively coupled to the controller 104. The first pressure sensor 174 and the second pressure sensor 176 may be configured to generate signals that are indicative of pressures bearing on the first pressure sensor 174 and the second pressure sensor 176, respectively, and the controller 104 may be configured to receive the pressure signals from the first pressure sensor 174 and the second pressure sensor 176.

The control valve 172 may include an actuator 182 that is operatively coupled to the controller 104, such that the controller 104 may adjust a flow area through the control valve 172 via the actuator 182. Furthermore, the controller may be configured to adjust a flow area through the control valve 172 based on signals from the first pressure sensor 174 and the second pressure sensor 176. According to an aspect of the disclosure, the controller is configured to adjust a flow area through the control valve 172 to maintain a pressure at the second pressure sensor 176 that is not less than the pressure (P_t) within the fuel storage tank 108 minus the first pressure differential (ΔP1), and not greater than the pressure (P_t) within the fuel storage tank 108 plus the second pressure differential (ΔP2). It will be appreciated that the two separate pressure sensors 174, 176 may be replaced with a single differential pressure sensor without departing from the scope of the present disclosure.

Returning now to FIG. 2, the high-pressure fuel system 122 may include an isolation valve 184, a pump 186, a fuel conditioning module 188, or combinations thereof. An inlet 190 of the pump 186 may be fluidly coupled to the second aperture 130 of the fuel storage tank 108 via a first high-pressure conduit 192, and an outlet 194 of the pump 186 may be fluidly coupled to the fuel conditioning module 188 via a second high-pressure conduit 196. The fuel conditioning module 188 may be fluidly coupled to the fuel injection system 124 of the IC engine 102 via a third high-pressure conduit 198. Accordingly, the second aperture 130 of the fuel storage tank 108 may be fluidly coupled to the IC engine 102 via the pump 186 and the fuel conditioning module 188, where the fuel conditioning module 188 is disposed downstream of the pump 186 along a flow direction extending from the inlet 190 of the pump 186 toward the outlet 194 of the pump 186.

The isolation valve 184 may compose a portion of the flow path of the first high-pressure conduit 192, and be disposed upstream of the pump 186 along a flow direction that extends from the inlet 190 of the pump 186 toward the outlet 194 of the pump 186. In an open configuration, the isolation valve 184 effects fluid communication between the fuel storage tank 108 and the inlet 190 of the pump 186 via the first high-pressure conduit 192. In a closed configuration, the isolation valve 184 blocks fluid communication between the fuel storage tank 108 and the inlet 190 of the pump 186 via the first high-pressure conduit 192.

The isolation valve 184 may include an actuator 200 that is operatively coupled to the controller 104. Accordingly, the controller 104 may selectively effect or block fluid communication between the fuel storage tank 108 and the pump 186 via the isolation valve 184 by adjusting the configuration of the isolation valve 184.

The pump 186 may be a variable displacement pump and include an actuator 202 for adjusting a displacement of the pump 186. The actuator 202 may be a swash-plate actuator or any other actuator known in the art to adjust the displacement of a pump. Further, the actuator 202 may be operatively coupled to the controller 104, such that the controller may adjust the displacement of the pump 186 via the actuator 202. Alternatively, it will be appreciated that the pump 186 may be a fixed displacement pump, a combination of two or more pumps having variable or fixed displacement, or any other pump configuration known in the art.

According to an aspect of the disclosure, the pump 186 is configured to deliver liquid-phase fuel at outlet 194 pressures in excess of 10,000 psi. Alternatively or additionally, the pump 186 is configured to deliver liquid-phase fuel at outlet 194 pressures in excess of twice a peak cylinder pressure during a compression within the IC engine 102. According to another aspect of the disclosure, the pump 186 is configured to deliver liquid-phase fuel at outlet 194 pressures greater than 50 times a pressure of gaseous-phase fuel flowing from the pressure control module 138 to the fuel injection system 124, when the pressure control module 138 is operating within a target pressure range above ambient pressure.

Although FIG. 2 shows the pump 186 disposed outside the fuel storage tank 108, it will be appreciated that the pump 186 may alternatively be disposed inside the fuel storage tank 108, such that the inlet 190 of the pump 186 is immersed in the liquid phase 134 of the fuel, and the outlet 194 of the pump 186 is fluidly coupled with and disposed upstream of the second aperture 130 of the fuel storage tank 108. Accordingly, an internal surface of the second high-pressure conduit 196 may define the second aperture 130 of the fuel storage tank 108. When the pump 186 is disposed within the fuel storage tank 108, the second aperture 130 and the isolation valve 184 may receive discharge pressure from the outlet 194 of the pump 186.

The pump 186 may be operatively coupled to a prime mover 204 via a shaft 206 for transmission of shaft power therebetween. The prime mover 204 may be an electrical motor, a hydraulic motor, or a pneumatic motor, for example. Alternatively or additionally, the prime mover 204 may be a shaft that is directly or indirectly driven by the IC engine 102 via a mechanical transmission, such as a belt-and-pulley transmission, a geared transmission, a hydraulic transmission, combinations thereof, or any other mechanical transmission known in the art. Thus, the shaft power load to operate the pump 186 may compose at least a portion of a load 208 imposed on the IC engine 102 via a shaft 210. The shaft 210 may be a crankshaft of the IC engine 102.

The fuel conditioning module 188 may include filters, heat exchangers, pressure regulators, instrumentation, combinations thereof, or any other components known in the art to benefit the conditioning of a fuel for delivery to the IC engine 102. According to an aspect of the disclosure, the fuel conditioning module 188 includes a heat exchanger 212 that is operatively coupled to a heating energy source 214, and that is configured to evaporate liquid-phase fuel exiting the outlet 194 of the pump 186 by transferring heat into the liquid-phase fuel. Accordingly, the fuel conditioning module 188 may be configured to receive fuel in a liquid phase from the pump 186 and deliver fuel in a gaseous phase to the fuel injection system 124 of the IC engine 102.

The heating potential across the terminals 216 and 218 of the heating energy source may be an electric potential to be applied to an electrical resistance heater, a pressure potential to drive a heat transfer fluid through a shell and tube heat exchanger, a temperature of heat transfer fluid, or combinations thereof, for example. It will be appreciated that a temperature of a heat transfer fluid from the heating energy source 214 would be greater than a temperature of the liquid-phase fuel inside the heat exchanger 212 to drive evaporation of the liquid-phase fuel.

The fuel conditioning module 188 may be operatively coupled to the controller 104, such that the controller may vary the heating potential across the terminals 216 and 218 of the fuel conditioning module 188. Heat transfer fluid provided by the heating energy source 214 may be engine coolant from the IC engine 102, lubricating oil from the IC engine 102, hydraulic fluid from the machine 100 (see FIG. 1), combinations thereof, or any other hot fluid source known in the art. Electrical current provided by the heating energy source 214 may be electrical current generated by an alternator or generator that composes at least a portion of the load 208 on the IC engine 102.

Referring still to FIG. 2, the fuel injection system 124 may be fluidly coupled to the accumulator 140 via a drain conduit 220, such that excess flow delivered to the fuel injection system 124 by the high-pressure fuel system 122 may be captured in the accumulator 140. A drain check valve 222 composes at least a portion of the flow path through the drain conduit 220. The drain check valve 222 is configured and arranged to allow flow through the drain conduit 220 only in a flow direction extending from the fuel injection system 124 toward the accumulator 140. It will be appreciated that the drain conduit 220 may be in fluid communication with the second low-pressure conduit 144 and the third low-pressure conduit 146 via the accumulator 140. Further, it will be appreciated that the drain conduit 220 may be in fluid communication with the second low-pressure conduit 144 and the third low-pressure conduit 146 via some other fluid node if no distinct accumulator is incorporated within the low-pressure fuel system 120. The drain check valve 222 may include a resilient element 223 that biases the drain check valve 222 toward a closed position.

The IC engine 102 may include a temperature sensor 224, a rotational speed sensor 226, or both. The temperature sensor 224 may generate a signal that is indicative of a fluid temperature within the IC engine 102, such as, a coolant temperature, an exhaust temperature, or an oil temperature; or generate a signal that is indicative of a metal temperature, such as a temperature of the block 300 or the head 306, for example. The rotational speed sensor 226 maybe configured to generate a signal that is indicative of a speed of the engine output shaft 210 or another speed that correlates with the speed of the shaft 210. Either the temperature sensor 224 or the speed sensor 226 may be operatively coupled to the controller 104 for transmission of sensor signals thereto.

Figure 5:
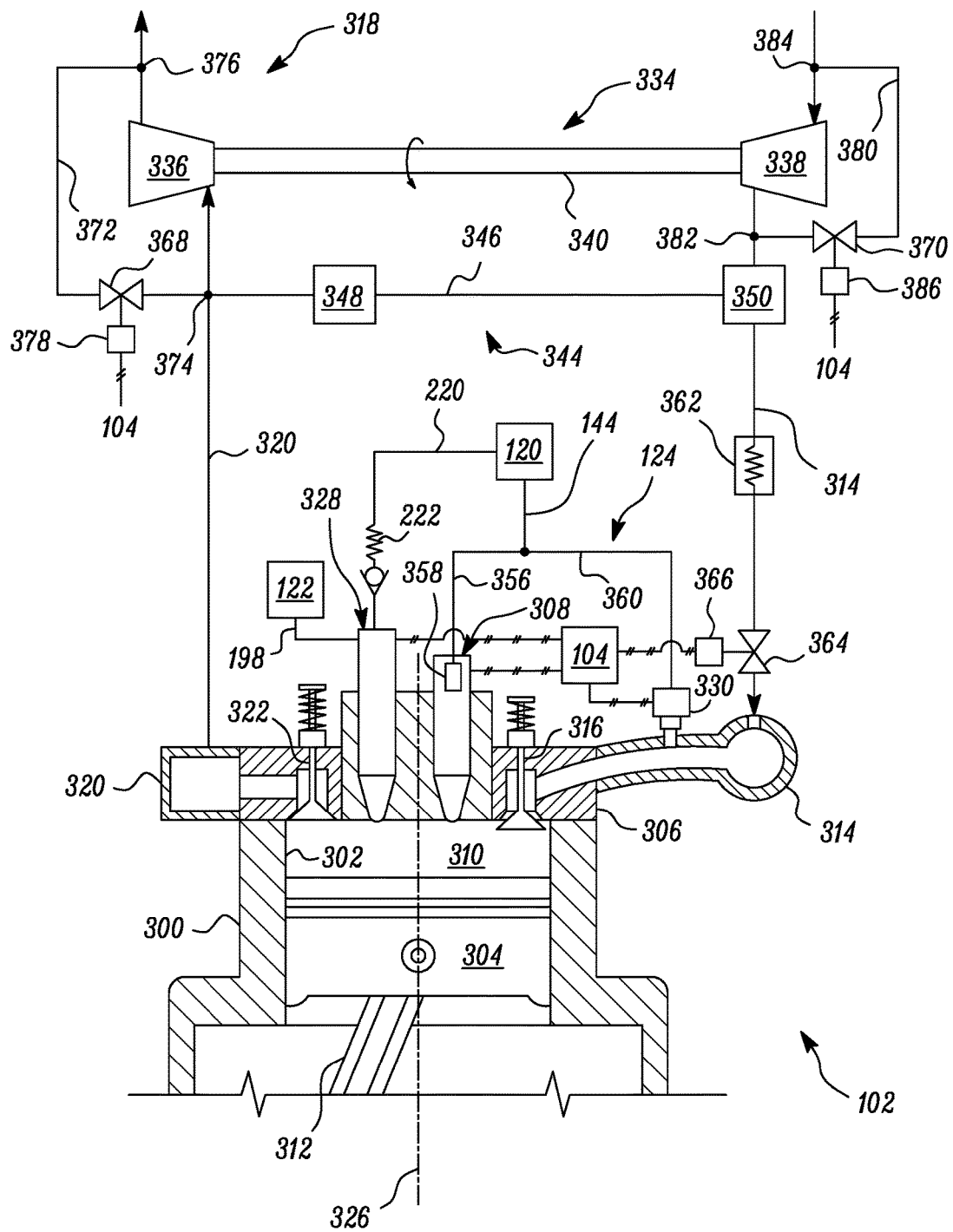
FIG. 5 is a schematic view of an engine including a fuel injection system, according to an aspect of the disclosure.

FIG. 5 is a schematic view of an engine 102 including a fuel injection system 124, according to an aspect of the disclosure. The IC engine 102 may include a block 300 defining at least one cylinder bore 302 therein, at least one piston 304 disposed in sliding engagement with the cylinder bore 302, and a head 306 disposed on the block 300. The fuel injection system 124 of the IC engine 102 may include a pre-chamber assembly 308, a direct fuel injector 328, and an intake fuel injector 330. The cross section in FIG. 2 is taken along a plane including a longitudinal axis 326 centered within the bore 302.

The cylinder bore 302, the piston 304, the head 306, the pre-chamber assembly 308, and the direct fuel injector 328 define, at least partly, a main combustion chamber 310. A volume of the main combustion chamber 310 may vary with the location of the piston 304 relative to the head 306, such that the volume of the main combustion chamber 310 is at a maximum when the piston 304 is located at Bottom Dead Center (BDC) of its stroke, and the volume of the main combustion chamber 310 is at a minimum when the piston 304 is located at Top Dead Center (TDC) of its stroke.

The IC engine 102 may operate according to a four-stroke cycle, including an intake stroke (from TDC to BDC), a compression stroke (from BDC to TDC), an expansion stroke (from TDC to BDC), and an exhaust stroke (from BDC to TDC). Alternatively, the IC engine 102 may operate according to a two-stroke cycle, including a compression/exhaust stroke (from BDC to TDC) and an expansion/exhaust/intake stroke (from TDC to BDC). It will be appreciated that the IC engine 102 may also operate according to any known modifications of the four-stroke cycle or the two-stroke cycle, including, but not limited to, the Miller Cycle, for example.

The piston 304 is pivotally connected to a crankshaft via a connecting rod 312 for transmitting mechanical power therebetween. Although only one piston 304 and cylinder bore 302 are shown in FIG. 5, it will be appreciated that the IC engine 102 may be configured to include any number of pistons and cylinder bores to suit a particular design or application.

The IC engine 102 receives a flow of oxidizer from an intake duct 314. One or more intake valves 316 effect selective fluid communication between the intake duct 314 and the main combustion chamber 310. The IC engine 102 discharges a flow of exhaust to the exhaust system 318 via an exhaust duct 320. One or more exhaust valves 322 effect selective fluid communication between the main combustion chamber 310 and the exhaust duct 320. The intake valves 316 and the exhaust valves 322 may be actuated by a cam/push-rod/rocker arm assembly, a solenoid actuator, a hydraulic actuator, or by any other cylinder valve actuator known in the art to open or close intake valves or exhaust valves.

A volume of the main combustion chamber 310 when the piston 304 is located at BDC divided by a volume of the main combustion chamber 310 when the piston 304 is located at TDC may define a volume ratio of the IC engine 102. According to an aspect of the disclosure, a volume ratio of the IC engine 102 is consistent with the volume ratios used for compression ignition engines. According to another aspect of the disclosure, the volume ratio of the IC engine 102 is greater than or equal to 12:1.

Referring still to FIG. 5, the IC engine 102 may include a turbocharger 334 having a turbine 336 operably coupled to a compressor 338 via a shaft 340. The turbine 336 receives a flow of exhaust gas via the exhaust duct 320 and extracts mechanical work from the exhaust gas by expansion of the exhaust gas therethrough. The mechanical work extracted from the turbine 336 from the flow of exhaust gas is transmitted to the compressor 338 via the shaft 340. The compressor 338 receives a flow of oxidizer, such as, for example, ambient air, and performs work on the flow of oxidizer by compression thereof. The flow of compressed oxidizer is discharged from the compressor 338 into the intake duct 314.

Additionally, the IC engine 102 may include an Exhaust Gas Recirculation (EGR) loop 344 for conveying exhaust gas into the oxidizer flow. The EGR loop 344 may include an EGR conduit 346 in fluid communication with the exhaust duct 320 upstream of the turbine 336, and in fluid communication with the intake duct 314 downstream of the compressor 338, effecting a so-called "high-pressure EGR loop." Alternatively, it will be appreciated that the IC engine 102 may also be equipped with a low-pressure EGR loop, where the EGR conduit 346 is in fluid communication with the exhaust duct 320 downstream of the turbine 336, and in fluid communication with the intake duct 314 upstream of the compressor 338.

The EGR conduit 346 may incorporate an EGR conditioning module 348 that effects cooling, filtering, or throttling of exhaust gases flowing therethrough, combinations thereof, or any other exhaust gas processing known to benefit the operation of the EGR loop 344. The EGR conduit 346 may fluidly couple with the intake duct 314 at a mixing device 350 configured to effect mixing between the recirculated exhaust gas and the flow of oxidizer.

The IC engine 102 receives combustible fuel from a low-pressure fuel system 120, a high-pressure fuel system 122, or both. The pre-chamber assembly 308 is disposed in direct fluid communication with the main combustion chamber 310, and may receive a flow of fuel from the low-pressure fuel system 120 via a pre-chamber fuel conduit 356 and a pre-chamber fuel injector 358. Accordingly, the low-pressure fuel system 120 may be in fluid communication with the main combustion chamber 310 via the pre-chamber assembly 308. Furthermore, the pre-chamber fuel injector 358 may be in fluid communication with the main combustion chamber 310 along a fluid path that does not include the direct fuel injector 328, the intake duct 314, or both.

The pre-chamber fuel injector 358 is configured to effect selective fluid communication between the low-pressure fuel system 120 and the pre-chamber assembly 308. For example, the pre-chamber fuel injector 358 may assume one of the following two configurations. According to a first configuration, the pre-chamber fuel injector 358 blocks fluid communication between the low-pressure fuel system 120 and the pre-chamber assembly 308 via the pre-chamber fuel conduit 356. According to a second configuration, the pre-chamber fuel injector 358 effects fluid communication between the low-pressure fuel system 120 and the pre-chamber assembly 308 via the pre-chamber fuel conduit 356.

The pre-chamber fuel injector 358 may include an actuator configured to change the fluid configuration of the pre-chamber fuel injector 358 under the control of the controller 104. The actuator for the pre-chamber fuel injector 358 may include a solenoid actuator, a hydraulic actuator, a pneumatic actuator, a mechanical actuator, such as, for example a cam actuator, combinations thereof, or any other fuel injector actuator known in the art. The controller 104 may control an amount of fuel delivered to the pre-chamber assembly 308 via the pre-chamber fuel injector 358 by controlling an opening time duration of the pre-chamber fuel injector 358, an effective flow area of the pre-chamber fuel injector 358, or combinations thereof.

An intake fuel injector 330 may be disposed in fluid communication with the intake duct 314 upstream of the intake valve 316, and the intake fuel injector 330 may be fluidly coupled to the low-pressure fuel system 120 via an intake supply conduit 360. Accordingly, the intake fuel injector 330 may be in fluid communication with the main combustion chamber 310 via a flow path that does not include the pre-chamber assembly 308, the direct fuel injector 328, or both.

The intake fuel injector 330 is configured to effect selective fluid communication between the low-pressure fuel system 120 and the main combustion chamber 310 via the intake duct 314. For example, the intake fuel injector 330 may assume one of the following two fluid configurations. According to a first configuration, the intake fuel injector 330 blocks fluid communication between the low-pressure fuel system 120 and the intake duct 314. According to a second configuration, the intake fuel injector 330 effects fluid communication between the low-pressure fuel system 120 and the intake duct 314.

The intake fuel injector 330 may include an actuator configured to change the fluid configuration of the intake fuel injector 330 under the control of the controller 104. The actuator for the intake fuel injector 330 may include a solenoid actuator, a hydraulic actuator, a pneumatic actuator, a mechanical actuator, such as, for example a cam actuator, combinations thereof, or any other fuel injector actuator known in the art. The controller 104 may control an amount of fuel delivered to the main combustion chamber 310 via the intake fuel injector 330 by controlling an opening time duration of the intake fuel injector 330, an effective flow area of the intake fuel injector 330, or combinations thereof.

A direct fuel injector 328 may be disposed in direct fluid communication with the main combustion chamber 310, and the direct fuel injector 328 may be fluidly coupled to the high-pressure fuel system 122 via the third high-pressure conduit 198. Accordingly, the direct fuel injector 328 may be in direct fluid communication with the main combustion chamber 310 via a flow path that does not include the pre-chamber assembly 308, the intake duct 314, or both.

The direct fuel injector 328 is configured to effect selective fluid communication between the high-pressure fuel system 122 and the main combustion chamber 310 via the third high-pressure conduit 198. For example, the direct fuel injector 328 may assume one of the following two fluid configurations. According to a first configuration, the direct fuel injector 328 blocks fluid communication between the high-pressure fuel system 122 and the main combustion chamber 310. According to a second configuration, the direct fuel injector 328 effects fluid communication between the high-pressure fuel system 122 and the main combustion chamber 310.

The direct fuel injector 328 may include an actuator configured to change the fluid configuration of the direct fuel injector 328 under the control of the controller 104. The actuator for the direct fuel injector 328 may include a solenoid actuator, a hydraulic actuator, a pneumatic actuator, a mechanical actuator, such as, for example a cam actuator, combinations thereof, or any other fuel injector actuator known in the art. The controller 104 may control an amount of fuel delivered to the main combustion chamber 310 via the direct fuel injector 328 by controlling an opening time duration of the direct fuel injector 328, an effective flow area of the direct fuel injector 328, or combinations thereof.

Any of the direct fuel injector 328, the pre-chamber fuel injector 358, or the intake fuel injector 330 may be hydraulically actuated using engine lubricating oil as the working fluid. However, it will be appreciated that any pressurized fluid available on the machine 100 may be used as a working fluid to actuate the direct fuel injector 328, the pre-chamber fuel injector 358, the intake fuel injector 330, or combinations, including but not limited to gaseous-phase fuel from either the low-pressure fuel system 120 or the high-pressure fuel system 122.

A heat exchanger 362, an intake throttle valve 364, or both, may compose at least a portion of the intake duct 314. The heat exchanger 362 may be configured receive a flow of oxidizer from the compressor 338 and a flow of heat transfer fluid, and cool the flow of oxidizer by effecting heat transfer from the flow of oxidizer to the heat transfer fluid. The heat transfer fluid for the heat exchanger 362 may be engine coolant, ambient air, combinations thereof, or any other heat transfer fluid known in the art.

The intake throttle valve 364 may be configured to restrict a flow of oxidizer from the compressor 338 into the main combustion chamber 310. The intake throttle valve 364 may have a butterfly valve structure, or any other suitable valve structure known in the art. The intake throttle valve 364 may include an actuator 366 that is configured to vary a flow area through the intake throttle valve 364. The actuator 366 may be operatively coupled to the controller 104, such that the controller 104 may adjust a flow area through the intake throttle valve 364 via the actuator 366. According to another aspect of the disclosure, the IC engine 102 does not include a throttle valve along the intake duct 314.

The IC engine 102 may include a turbine bypass valve 368, a compressor recirculation valve 370, or both. A turbine bypass conduit 372 may extend from a point 374 on the exhaust conduit 320, upstream of the turbine 336, to a point 376 on the exhaust conduit 320 downstream of the turbine 336; and the turbine bypass valve 368 may define a portion of a flow path along the turbine bypass conduit 372. Alternatively, it will be appreciated that the point 376 downstream of the turbine 336 may be in direct fluid communication with an ambient environment of the IC engine 102 instead of the exhaust duct 320.

In a first configuration, the turbine bypass valve 368 blocks the flow path through the turbine bypass conduit 372. In a second configuration, the turbine bypass valve 368 effects fluid communication between the points 374 and 376, thereby bypassing a flow of exhaust around the turbine 336. The turbine bypass valve 368 may include an actuator 378 that is configured to adjust the turbine bypass valve 368 between its first configuration and its second configuration. Further, the actuator 378 may be operatively coupled to the controller 104, such that the controller 104 may selectively effect bypass flow through the turbine bypass conduit 372 by adjusting the configuration of the turbine bypass valve 368 via the actuator 378.

A compressor recirculation conduit 380 may extend from a point 382 on the intake duct 314, downstream of the compressor 338, to a point 384 on the intake duct 314, upstream of the compressor 338; and the compressor recirculation valve 370 may define a portion of a flow path along the compressor recirculation conduit 380. Alternatively, it will be appreciated that the point 384 upstream of the compressor 338 may be in direct fluid communication with an ambient environment of the IC engine 102 instead of the intake duct 314.

In a first configuration, the compressor recirculation valve 370 blocks the flow path through the compressor recirculation conduit 380. In a second configuration, the compressor recirculation valve 370 effects fluid communication between the points 382 and 384, thereby bypassing a flow of oxidizer around the compressor 338 and away from the main combustion chamber 310. The compressor recirculation valve 370 may include an actuator 386 that is configured to adjust the compressor recirculation valve 370 between its first configuration and its second configuration. Further, the actuator 386 may be operatively coupled to the controller 104, such that the controller 104 may selectively effect bypass flow through the compressor recirculation conduit 380 by adjusting the configuration of the compressor recirculation valve 370 via the actuator 386.

The controller 104 may be in data communication with a user interface for receiving control inputs from an operator of the machine 100. Further, the controller 104 may be in data communication with the IC engine 102 via one or more data connections for receiving sensor signals from the IC engine 102, delivering control inputs to the IC engine 102, combinations thereof, or for transmitting any data known in the art to be relevant to operation of the IC engine 102. It will be appreciated that any data connections between the controller 104 and any other element of the IC engine 102 may include wired connections, wireless connections, combinations thereof, or any other data communication means known in the art.

The controller 104 may be any purpose-built processor for effecting control of the IC engine 102, the machine 100, or combinations thereof. It will be appreciated that the controller 104 may be embodied in a single housing, or a plurality of housings distributed throughout the machine 100. Further, the controller 104 may include power electronics, preprogrammed logic circuits, data processing circuits, volatile memory, non-volatile memory, software, firmware, combinations thereof, or any other controller structures known in the art.

Figure 6:
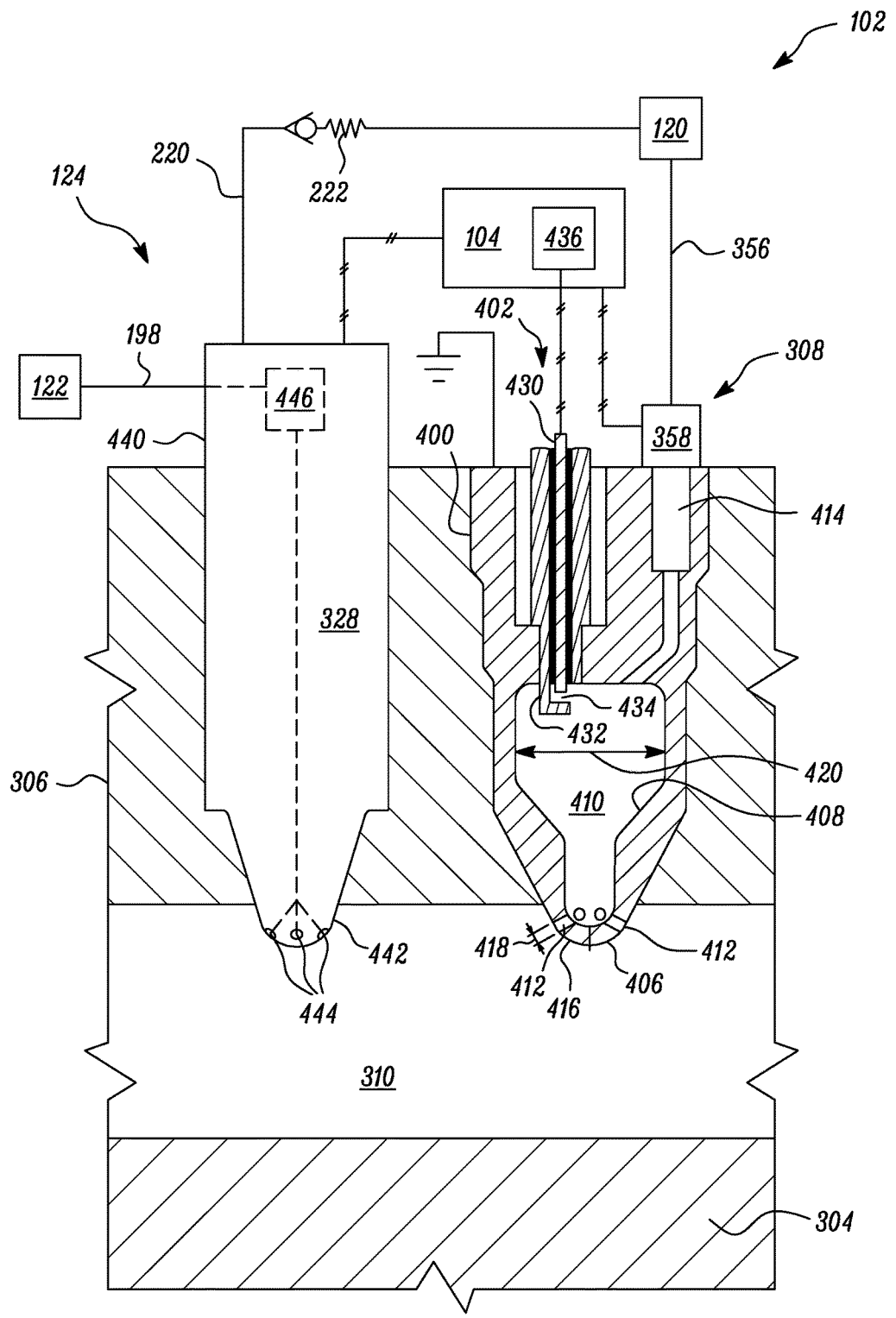
FIG. 6 is a schematic cross-sectional view of a portion of a fuel injection system, according to an aspect of the disclosure.

FIG. 6 is a schematic cross-sectional view of a portion of a fuel injection system 124, according to an aspect of the disclosure. The portion of the fuel injection system 124 illustrated in FIG. 6 includes a pre-chamber assembly 308 and a direct fuel injector 328. The pre-chamber assembly 308 includes a body 400, an ignition energy source 402, a pre-chamber fuel injector 358, or combinations thereof. Although the body 400 of the pre-chamber assembly 308 is shown as distinct and perhaps separable from the head 306, it will be appreciated that the head 306 may compose portions of the body 400 or an entirety of the body 400.

An external surface 406 of the pre-chamber assembly 308 at least partly defines the main combustion chamber 310.

According to an aspect of the disclosure, the external surface 406 may project beyond the head 306 into the main combustion chamber 310. An internal surface 408 of the pre-chamber assembly 308 defines a pre-chamber cavity 410 and a plurality of outlet orifices 412, and optionally defines a pre-chamber fuel supply conduit 414.

The outlet orifices 412 extend through a wall 416 of the body 400 and effect fluid communication between the pre-chamber cavity 410 and the main combustion chamber 310. According to an aspect of the disclosure, a transverse dimension 418 of one or more of the outlet orifices 412 is less than 25% of a transverse dimension 420 of the pre-chamber cavity 410. According to another aspect of the disclosure, a transverse dimension 418 of one or more of the outlet orifices 412 is less than 15% of a transverse dimension 420 of the pre-chamber cavity 410. Accordingly, fluid flow from the pre-chamber cavity 410 to the main combustion chamber 310 via the plurality of outlet orifices 412 is accelerated by a reduction in flow area through the plurality of outlet orifices 412 to form fluid jets projecting into the main combustion chamber 310.

According to an aspect of the disclosure, the ignition energy source 402 is an electric spark plug including an anode 430 and a cathode 432. The anode 430 and the cathode 432 are electrically insulated from one another and define a spark gap 434 within the pre-chamber cavity 410. The cathode 432 may be electrically coupled to a chassis ground of the pre-chamber assembly 308, the engine 102, the machine 100, or combinations thereof. The anode 430 is electrically coupled to the controller 104 via a high voltage source 436, and the controller 104 is configured to effect application of a voltage difference across the spark gap 434 sufficient to cause an electric spark to arc across the spark gap 434. In turn, the electric spark across the spark gap 434 may be configured to effect a desired degree or intensity of chemical reactions between a fuel and an oxidizer disposed within the pre-chamber cavity 410.

Alternatively or additionally, the ignition energy source 402 may include a laser energy source optically coupled to the pre-chamber cavity 410, a glow plug, a corona ignition discharge device, or combinations thereof. The laser energy source may be operatively coupled to the controller 104, and the controller 104 may be configured to cause the laser energy source to transmit a beam of laser light into the pre-chamber cavity 410 for effecting a desired degree or intensity of chemical reactions between a fuel and an oxidizer disposed within the pre-chamber cavity 410.

The internal surface 408 of the body 400 may define a pre-chamber fuel supply conduit 414 that is in fluid communication with the pre-chamber fuel injector 358 and the pre-chamber cavity 410. Accordingly, the pre-chamber fuel injector 358 may effect fluid communication between the low-pressure fuel system 120 and the pre-chamber cavity 410 via the pre-chamber fuel supply conduit 414, and along a flow path that does not include the main combustion chamber 310. Although FIG. 6 shows the pre-chamber fuel supply conduit 414 integrated within the body 400, it will be appreciated that the pre-chamber fuel supply conduit 414 could also be embodied as a separate conduit external to the body 400 and passing through the body 400 to effect fluid communication with the pre-chamber cavity 410.

The direct fuel injector 328 may include a body 440 and a control valve assembly 446. The body 440 of the direct fuel injector 328 may include an exterior surface 442 that at least partly defines the main combustion chamber 310. Further, the body 440 of the direct fuel injector 328 may define a plurality of orifices 444 that are in selective fluid communication with the high-pressure fuel system 122 via the control valve assembly 446. The control valve assembly 446 may be operatively coupled to the controller 104, such that the controller may effect selective fluid communication between the high-pressure fuel system 122 and the main combustion chamber 310 via the plurality of orifices 444 by control of the control valve assembly 446.

During operation of the IC engine 102, the pre-chamber cavity 410 may receive a flow of oxidizer from the main combustion chamber 310 via the outlet orifices 412 during an intake stroke of the piston 304, a compression stroke of the piston 304, or combinations thereof. The flow of oxidizer from the main combustion chamber 310 to the pre-chamber cavity 410 may be driven by convection, diffusion, or combinations thereof, through the outlet orifices 412.

The controller 104 may be configured to produce a mixture of fuel and oxidizer within the pre-chamber cavity 410 by actuation of the pre-chamber fuel injector 358, thereby causing a flow of fuel into the pre-chamber cavity 410 from the low-pressure fuel system 120. Further, the controller 104 may be configured to energize the ignition energy source 402, and thereby ignite the mixture of fuel and oxidizer disposed within the pre-chamber cavity 410. Expansion of the burning gases within the pre-chamber cavity 410 may cause a flow of combustion products, reacting fuel-oxidizer mixture, unreacted fuel-oxidizer mixture, or combinations thereof from the pre-chamber cavity 410 into the main combustion chamber 310 in the form of fluid jets emanating from the outlet orifices 412. In turn, the ignited jet flow from the pre-chamber cavity 410 through the outlet orifices may cause ignition of a fuel-oxidizer mixture disposed within the main combustion chamber 310. It will be appreciated that the controller 104 may be configured to effect a mixture of fuel and oxidizer within the main combustion chamber 310 by delivering fuel to the main combustion chamber 310 via the direct fuel injector 328, the intake fuel injector 330, or combinations thereof.

According to an aspect of the disclosure, the engine 102 may not include a pre-chamber assembly 308 and its corresponding pre-chamber fuel injector 358, but instead embody an ignition energy source 402 in direct operative coupling with the main combustion chamber 310. In turn, the ignition energy source 402 may directly cause ignition of a fuel-oxidizer mixture within the main combustion chamber 310 based on fuel delivered to the main combustion chamber 310 via the direct fuel injector 328, the intake fuel injector 330, or combinations thereof, but not a pre-chamber fuel injector 358.

Figure 7:
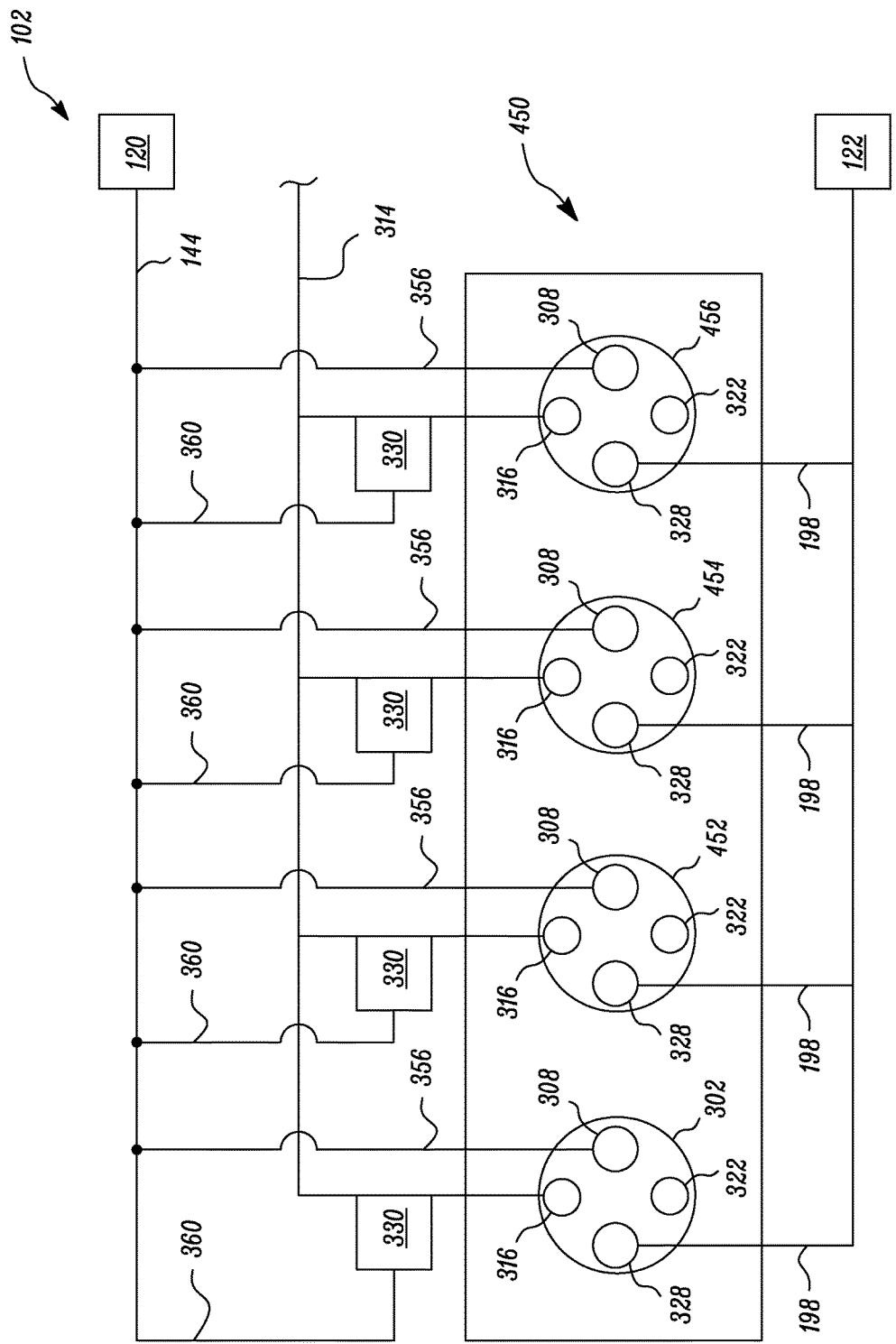
FIG. 7 is a schematic view of an engine with a plurality of engine cylinders, according to an aspect of the disclosure.

FIG. 7 is a schematic view of an engine 102 with a plurality of engine cylinders 450, according to an aspect of the disclosure. The plurality of engine cylinders 450 may include a first cylinder 302, a second cylinder 452, a third cylinder 454, and a fourth cylinder 456. Any of the second cylinder 452, the third cylinder 454, and the fourth cylinder 456 may include the features of the first cylinder 302, as shown in the non-limiting aspect illustrated in FIGS. 5 and 6, for example. Specifically, any cylinder of the plurality of cylinders 450 may include a piston 304, a pre-chamber assembly 308 that is fluidly coupled to both the low-pressure fuel system 120 and the main combustion chamber 310, an intake fuel injector 330 that is fluidly coupled to the low-pressure fuel system 120 and the intake duct 314, and a direct fuel injector 328 that is fluidly coupled to the high-pressure fuel system and the main combustion chamber 310.

Although FIG. 7 shows four engine cylinders composing the plurality of cylinders 450, it will be appreciated that the plurality of engine cylinders 450 may include any number of engine cylinders greater than or equal to two. Further, it will be appreciated that components of the exhaust system 318 (see FIG. 5), the fuel supply system 106 (e.g., the drain conduits 220), as well as other engine components, have been omitted from FIG. 7 to promote clarity of other features.

INDUSTRIAL APPLICABILITY

The present disclosure is applicable to reciprocating-piston internal combustion engines, and more particularly to fuel systems for reciprocating-piston internal combustion engines that draw fuel from a storage tank in both a gaseous phase and a liquid phase.

Conventional compression ignition engines inject most, if not all, of the fuel directly into engine cylinders near TDC of the compression stroke, when pressures and temperatures within the cylinders are sufficient to support autoignition of the fuel. In turn, conventional compression ignition engines tend to operate with relatively high-cetane fuels, with correspondingly short ignition delay times, to promote fast ignition and therefore precise ignition timing control. Non-limiting examples of relatively high-cetane fuels include distillate diesel fuel, biodiesel fuel, dimethyl either, and seed oils.

According to an aspect of the disclosure, a relatively high-cetane value may be a cetane number not less than about 45. According to another aspect of the disclosure, a compression ignition engine operates with a compression ratio not less than 12:1.

Using lower cetane fuels in compression ignition engines may provide advantages regarding regulated exhaust emissions, fuel cost, or both. However, the lower cetane fuels have correspondingly longer ignition delay times, which may result in larger variance in time between fuel injection and ignition within a combustion chamber. Thus, operating conventional compression ignition engines with lower cetane fuels may pose challenges with respect to combustion control. Non-limiting examples of relatively lower cetane fuels include methane, natural gas, propane, gasoline, and alcohols.

Conventional spark-ignition engines tend to premix most, if not all, of the fuel with oxidizer before initiating ignition with an external ignition energy source, such as, as spark plug or a corona discharge device. As a result, conventional spark-ignition engines tend to use fuels with relatively low-cetane values, and correspondingly long ignition delay times, to avoid premature ignition of the fuel-oxidizer mixture during the compression stroke and before activation of the external ignition energy source. However, conventional spark-ignition engines also tend to operate at compression ratios that are lower than conventional compression ignition engines. In turn, conventional spark-ignition engines tend to operate at a lower brake mean effective pressure (BMEP) than conventional compression ignition engines, and therefore operate at a lower thermodynamic efficiency than conventional compression ignition engines.

Conventional dual-fuel engines have been developed to take advantage of the economics and emissions performance of low-cetane fuels at the compression ratios, and therefore the BMEPs, of conventional compression ignition engines. Accordingly, some conventional dual-fuel engines derive most of their heat release (90% or more) from a low-cetane fuel, where ignition of mixtures of the low-cetane fuel and an oxidizer is controlled by injection of a small quantity of high-cetane fuel just before the desired ignition timing.

Although conventional dual-fuel engines may enjoy some benefits of both conventional compression ignition and properties of low-cetane fuels, the technology still poses challenges. For example, when the low-cetane fuel is a gaseous fuel, storage and delivery of the low-cetane fuel may pose challenges. Storing the low-cetane fuel exclusively in a gaseous phase, even at very high-pressure, may not provide sufficient energy storage density for some applications. Conversely, storing the low-cetane fuel as a cryogenic liquid may help to boost energy storage density, but add complexity to fuel delivery to the engine 102.

In some applications, the low-cetane fuel is stored as a cryogenic liquid, which is pumped to a sufficiently high-pressure for direct injection, and then evaporated to a gaseous phase for direct injection into the engine 102. Waste heat from the engine 102 may be a practical heat source for evaporating the cryogenic liquid fuel, but using engine waste heat to evaporate the low-cetane fuel may pose challenges during cold starts of the engine 102, especially at cold ambient conditions.

Additionally, the logistics of providing distribution infrastructure for two different fuel types for a conventional dual-fuel engine, and balancing inventory management of two different fuel compositions onboard a machine 100, may pose other challenges to operating a conventional dual-fuel engine. For example, depleting a reserve of high-cetane fuel onboard a machine 100 with a conventional dual-fuel engine before depleting the reserve of low-cetane fuel, or vice-versa, may compromise operation of the machine 100.

Accordingly, the present inventors have developed a cryogenic fuel storage and delivery system, fuel injection system, and corresponding methods, that enable an engine 102 to operate with high power density (i.e., high BMEP) and with a single, low-cetane value fuel, to address the aforementioned challenges with conventional compression ignition engines, conventional spark-ignition engines, and conventional dual-fuel engines.

According to an aspect of the disclosure, the IC engine 102 may be operated in a first mode, such that fuel is supplied to the main combustion chamber 310 of the IC engine 102 from the low-pressure fuel system 120, and the main combustion chamber 310 receives no fuel from the high-pressure fuel system 122 (see FIG. 2) throughout the crankshaft cycle. During the first operating mode, the controller 104 may act to close the isolation valve 184, deactivate operation of the pump 186, adjust the direct fuel injector 328 to a closed configuration, or combinations thereof, throughout the crankshaft cycle. Further according to the first operating mode of the IC engine 102, most of the required fuel is supplied to the main combustion chamber 310 of each engine cylinder from the low-pressure fuel system 120 via the intake fuel injector 330 and the intake duct 314, and a smaller amount of pilot fuel is supplied to the pre-chamber assembly 308 from the low-pressure fuel system 120 via the pre-chamber fuel injector 358.

To decrease the fuel supply pressure necessary to deliver a sufficient amount of fuel to the pre-chamber assembly 308, the operation of the pre-chamber fuel injector 358 may be timed to deliver fuel to the pre-chamber cavity 410 while the corresponding piston 304 is undergoing the intake stroke, or is disposed early in the compression stroke. In addition, the turbine bypass valve 368 may be opened to bypass exhaust flow around the turbine 336, the compressor recirculation valve 370 may be opened to recirculate compressed oxidizer about the compressor 338, or combinations thereof, to decrease pressure in the intake duct 314, and thereby further help decrease the fuel supply pressure necessary to deliver a sufficient amount of fuel to the main combustion chamber 310 via the intake fuel injector 330. Further, it will be appreciated that reducing the pressure in the intake duct 314 may beneficially reduce the pressure and temperature rise within the main combustion chamber 310 during the compression stroke of the piston 304, thereby reducing the probability of premature ignition of the fuel from the intake fuel injector 330 in mixture with oxidizer within the main combustion chamber 310. Instead, according to the first mode of operation, ignition of the fuel-oxidizer mixture within the main combustion chamber 310 is initiated by the controller 104 via the ignition energy source 402, as discussed previously.

Accordingly, the pressure in the low-pressure fuel system 120 may be sufficient to operate the engine in the first mode with all cylinders firing during each crankshaft cycle, and without restricting oxidizer flow through the intake duct 314 via an intake throttle valve 364. As used here, the term "crankshaft cycle" refers to 720 degrees of crankshaft rotation when the IC engine 102 operates on a four-stroke cycle, and refers to 360 degrees of crankshaft rotation when the IC engine 102 operates on a two-stroke cycle.

In some configurations of the IC engine 102, and perhaps depending upon ambient air pressure and temperature, among other considerations, the pressure available to the low-pressure fuel system 120 from the fuel storage tank 108 may not be sufficient to deliver a desired amount of fuel to the pre-chamber assembly 308 and the main combustion chamber 310. It will be appreciated that if the fuel-oxidizer mixture within a main combustion chamber 310 becomes too lean as a result of insufficient fuel flow, ignition of the fuel-oxidizer mixture may become difficult, burning of the fuel-oxidizer mixture may not proceed to sufficient completion to effectively control regulated emissions, or combinations thereof. In turn, the controller 104 may take further control action to operate the IC engine 102 in the first mode.

According to an aspect of the disclosure, the controller 104 may restrict oxidizer flow through the intake duct 314 by adjusting a configuration of an intake throttle valve 364 (see FIG. 5) to decrease a flow area through the intake throttle valve 364. As a result, oxidizer flow through the intake duct 314 decreases, and the fuel demand in main combustion chambers 310 and the pre-chamber assemblies 308 is reduced to maintain sufficient fuel-oxidizer mixture strength. Although throttling the oxidizer flow through the intake duct 314 via the intake throttle valve 364 may decrease thermodynamic efficiency of the IC engine 102 by decreasing BMEP, throttling the oxidizer flow may provide operability advantages by avoiding the need to operate the high-pressure fuel system 122, and may reduce the likelihood of premature ignition of the fuel-oxidizer mixture within the main combustion chamber 310 by reducing pressure and temperature rise within the main combustion chamber 310 during the compression stroke, compared to the unthrottled condition.

According to another aspect of the disclosure, the controller 104 may effect a skip-fire operating mode of the IC engine 102 to reduce the total fuel flow required to operate the IC engine 102 in the first mode. According to the skip-fire strategy, only a fraction of the cylinders of the plurality of cylinders 450 (see FIG. 7) are operated during a crankshaft cycle.

As part of a skip-fire operating strategy, the controller 104 may deactivate one or more cylinders by not delivering any fuel to those cylinders during that crankshaft cycle. Furthermore, given sufficient flexibility in operation of the intake valves 316, the exhaust valves 322, or both, the controller 104 may hold open an intake valve 316, an exhaust valve 322, or both, of a non-active cylinder during at least a portion of the crankshaft cycle of a skip-fire mode to decrease compression work needed to reciprocate the piston 304 of the non-active cylinder.

It will be appreciated that the particular cylinders deactivated by the skip-fire strategy may change from one crankshaft cycle to the next, and the number or fraction of deactivated cylinders may be varied by the controller 104 from one crankshaft cycle to the next.

The controller 104 may be configured to both decrease a flow area through the intake throttle valve 364, and to effect a skip-fire operating strategy as part of the first operating mode of the IC engine 102. However, according to another aspect of the disclosure, the IC engine 102 does not include an intake throttle valve 364.

According to another aspect of the disclosure, the IC engine 102 may be operated according to a second mode, such that fuel is supplied to the IC engine 102 from both the high-pressure fuel system 122 and the low-pressure fuel system 120 during a crankshaft cycle. According to the second operating mode, the controller 104 may cause the pump 186 to receive a flow of liquid-phase fuel from the fuel storage tank 108 and pump the flow of liquid-phase fuel to a pressure that is higher than a pressure in the low-pressure fuel system 120. Additionally, the controller 104 may cause the fuel conditioning module 188 to evaporate the flow of liquid-phase fuel to create a flow of high-pressure gaseous-phase fuel for delivery to the main combustion chamber 310 via the direct fuel injector 328.

Further according to the second operating mode, a flow of pilot fuel may be delivered from the low-pressure fuel system 120 to the pre-chamber assembly 308 via the pre-chamber fuel injector 358. Similar to the first operating mode, the operation of the pre-chamber fuel injector 358 may be timed to deliver fuel to the pre-chamber cavity 410 while the corresponding piston 304 is undergoing the intake stroke, or is disposed early in the compression stroke, to limit the amount of pressure necessary from the low-pressure fuel system 120 to deliver the desired amount of pilot fuel to the pre-chamber assembly 308.

During the second mode of operation, the high-pressure fuel system 122 may provide fuel to the direct fuel injector 328 at a sufficient pressure to directly inject fuel into the main combustion chamber 310 at any point during the compression stroke of the piston 304. Accordingly, the controller 104 may cause the direct fuel injector 328 to inject fuel into the main combustion chamber 310 during any time interval that might be used for fuel injection into a conventional direct injection compression ignition engine. It will be appreciated that direct injection of fuel into the main combustion chamber 310 via the direct injector 328 near the top of the compression stroke of the piston 304, during the second mode of operation, may help to avoid premature ignition of a fuel-oxidizer mixture within the main combustion chamber 310 by limiting residence time of the fuel from the direct injector 328 within the main combustion chamber 310. Instead, according to the second mode of operation, ignition of the fuel-oxidizer mixture within the main combustion chamber 310 is initiated by the controller 104 via the ignition energy source 402, as discussed previously.

Further according to the second operating mode of the IC engine 102, the controller 104 may cause the turbine bypass valve 368 to close, and the compressor recirculation valve 370 to close, in order to increase the pressure in the intake duct 314. Moreover, if the IC engine 102 is equipped with an intake throttle valve 364, the controller 104 may configure the intake throttle valve to its wide-open configuration during the second operating mode, such that a flow area through the intake throttle valve 364 is maximized.

Operation of the direct fuel injector 328 during the second operating mode of the IC engine 102 may inherently result in a stream of bleed fuel that must be directed away from direct fuel injector 328. The stream of bleed fuel may be directed to the low-pressure fuel system 120 via the drain conduit 220 and the drain check valve 222 (see FIG. 5). Directing the stream of bleed fuel to the low-pressure fuel system 120 instead of the fuel storage tank 108 may provide the benefits of avoiding an additional heat load applied to the fuel storage tank 108, and promoting pressure maintenance of the low-pressure fuel system 120 without drawing additional fuel from the fuel storage tank 108. Furthermore, directing the stream of bleed fuel to the low-pressure fuel system 120 instead of the ambient environment of the IC engine 102 may provide the benefits of improving fuel efficiency by eventually burning the bleed fuel stream in the pre-chamber assembly 308, and by reducing regulated emissions from the IC engine 102.

According to an aspect of the disclosure, the main combustion chamber 310 may receive fuel from both the high-pressure fuel system 122 via the direct fuel injector 328, and the low-pressure fuel system 120 via the intake fuel injector 330 during the second mode of operation. Indeed, delivering a portion of the total fuel to the main combustion chamber 310 via the intake fuel injector 330, during the second mode of operation, may provide a benefit of promoting overall mixedness of the fuel and oxidizer within the main combustion chamber 310, or promoting a strategy of deliberately tailoring stratification of the concentration of fuel and oxidizer within the main combustion chamber 310.

Further, the controller 104 may vary the quantity of fuel delivered to the pre-chamber fuel injector 358, the intake fuel injector 330, or both, via the low-pressure fuel system 120 to manage pressure in the low-pressure fuel system 120. For example, the controller 104 may increase an amount of fuel delivered to the IC engine 102 via the low-pressure fuel system 120 to avoid returning some or any of the bleed flow from the direct fuel injector 328 to the low-pressure fuel system 120, and its corresponding thermal heat content (contrast with the fuel's chemical heating value), back to the fuel storage tank 108 via the pressure control module 138. Accordingly, the controller 104 may vary the quantity of fuel delivered to the IC engine 102 via the low-pressure fuel system 120 to promote thermal management of the fuel storage tank 108.

Figure 8:
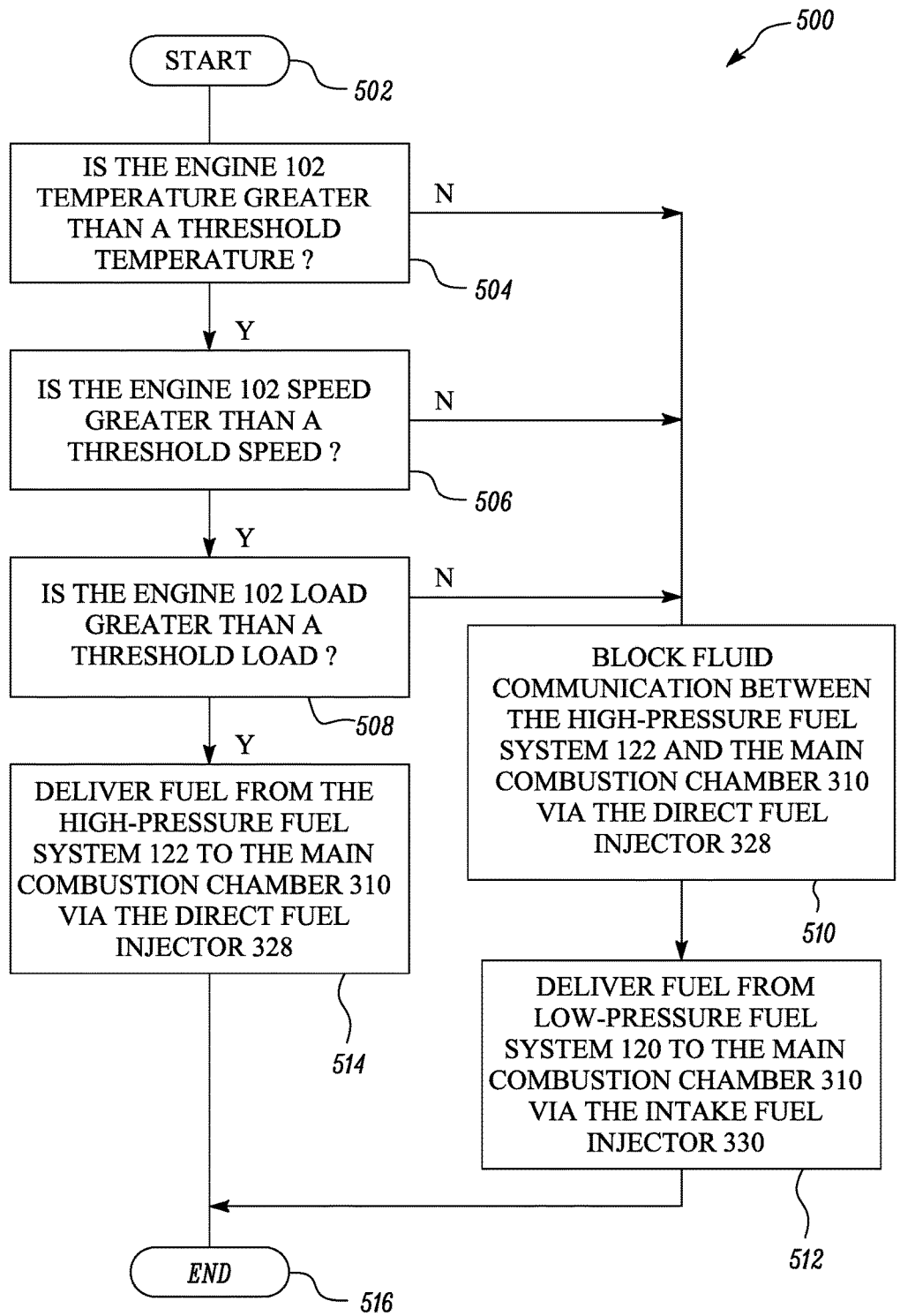
FIG. 8 is a flowchart of a method for operating an engine, according to an aspect of the disclosure.

FIG. 8 is a flowchart of a method 500 for operating an IC engine 102, according to an aspect of the disclosure. From the start in step 502, the method 500 determines whether a temperature of the IC engine 102 is greater than a threshold temperature in step 504. The temperature of the IC engine 102 may be a temperature measured by the temperature sensor 224 (see FIG. 2), or any other temperature sensor in thermal communication with the IC engine 102. According to an aspect of the disclosure, the threshold temperature in step 504 is a temperature indicating that the IC engine 102 is generating sufficient waste heat to evaporate a target fuel flow through the fuel conditioning module 188 using engine waste heat, at least in part, as the fuel heating potential. If the temperature of the IC engine 102 is greater than the threshold temperature in step 504, then the method 500 proceeds to step 506.

In step 506, the method 500 determines whether a speed of the IC engine 102 is greater than a threshold speed. The speed of the IC engine 102 may be determined from the speed sensor 226 (see FIG. 2) or any other engine speed determination method known in the art. The threshold speed in step 506 may be indicative of an idle speed of the IC engine 102. If the speed of the IC engine 102 is greater than the threshold speed, then the method 500 proceeds to step 508.

In step 508, the method 500 determines whether a load of the IC engine 102 is greater than a threshold load. The load of the IC engine 102 may be determined based on a speed of the IC engine 102, a torque of the IC engine 102, a fuel flow consumed by the IC engine 102, combinations thereof, or any other method for determining or estimating a load of an engine. The threshold load in step 508 may be a load that indicates that the IC engine 102 is generating sufficient waste heat to evaporate a target fuel flow through the fuel conditioning module 188 using engine waste heat, at least in part, as the fuel heating potential. Alternatively or additionally, the threshold load in step 508 may be about 20% of a rated load of the IC engine 102.

If the results of all of steps 504, 506, and 508 is affirmative, then the method 500 proceeds to step 514, where fuel from the high-pressure fuel system 122 is delivered to the main combustion chamber 310 via the direct fuel injector 328. It will be appreciated that the step 514 is consistent with the second operating mode of the IC engine 102 described above, and may indicate that the IC engine 102 may run in the aforementioned second operating mode.

If the result of any of the steps 504, 506, and 508 is negative, then the method 500 proceeds to step 510, where fluid communication between the high-pressure fuel system 122 and the main combustion chamber 310 is blocked via the direct fuel injector 328 for at least one full crankshaft cycle. Next, in step 512, fuel is delivered from the low-pressure fuel system 120 to the main combustion chamber 310 via the intake fuel injector 330. It will be appreciated that the steps 510 and 512 are consistent with the first operating mode of the IC engine 102 described above, and may indicate that the IC engine 102 may run in the aforementioned first operating mode.

Although the non-limiting method 500 illustrated in FIG. 8 includes all three of steps 504, 506, and 508, it will be appreciated that the method 500 may exclude any one or two of the steps 504, 506, and 508 without departing from the scope of the disclosure. Further, it will be appreciated that any of the threshold values used in steps 504, 506, and 508 may be useful in determining if the IC engine 102 is not already running and should be configured in the first operating mode, consistent with steps 510 and 512, for performing an engine starting procedure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Any of the methods or functions described herein may be performed by or controlled by the controller 104. Further, any of the methods or functions described herein may be embodied in a computer-readable non-transitory medium for causing the controller 104 to perform the methods or functions described herein. Such computer-readable non-transitory media may include magnetic disks, optical discs, solid state disk drives, combinations thereof, or any other computer-readable non-transitory medium known in the art. Moreover, it will be appreciated that the methods and functions described herein may be incorporated into larger control schemes for an engine, a machine, or combinations thereof, including other methods and functions not described herein.

When referring to fluid coupling or fluid communication herein, the term "via" will be understood to mean "by way of" or "through." Accordingly, when a first component is fluidly coupled to a second component via a third component, the third component is disposed fluidly in series between the first component and the second component along a flow path from the first component to the second component, without having to flow through either the first component or the second component more than once to define such a flow path. It will also be understood that a first component being fluidly coupled to a second component via a third component, leaves open the possibility of intervening components other than the third component being additionally fluidly coupled in series between the first component and the second component.

We claim:

1. A fuel supply system for a reciprocating-piston engine, the fuel supply system comprising:
   a storage tank, a wall of the storage tank defining a first aperture and a second aperture therethrough, the first aperture being distinct from the second aperture;
   a first fuel injector fluidly coupled with the first aperture of the storage tank via a pressure control module and a first fuel injector supply conduit, the first fuel injector supply conduit being disposed fluidly in series between the pressure control module and first fuel injector,
   the pressure control module being configured to maintain a pressure in the first fuel injector supply conduit that is less than a pressure inside the storage tank;
   a pump fluidly coupled with the second aperture of the storage tank; and
   a second fuel injector fluidly coupled with an outlet port of the pump via a second fuel injector supply conduit, the pump being configured to maintain a pressure inside the second fuel injector supply conduit that is greater than the pressure inside the first fuel injector supply conduit.

2. The fuel supply system of claim 1, wherein the pressure control module includes a first check valve and a second check valve,
   the first check valve being configured and arranged to effect fluid communication therethrough only along a flow direction extending from the storage tank toward the first fuel injector supply conduit,
   the second check valve being configured and arranged to effect fluid communication therethrough only along a flow direction extending from the first fuel injector supply conduit toward the storage tank.

3. The fuel supply system of claim 2, wherein the pressure control module includes a first resilient member that biases the first check valve to allow flow therethrough only when a pressure at an inlet to the first check valve exceeds a pressure at an outlet of the first check valve by a first pressure differential, and wherein the pressure control module includes a second resilient member that biases the second check valve to allow flow therethrough only when a pressure at an inlet to the second check valve exceeds a pressure at an outlet of the second check valve by a second pressure differential.

4. The fuel supply system of claim 3, wherein the first pressure differential is greater than the second pressure differential.

5. The fuel supply system of claim 1, wherein the second fuel injector defines an outlet drain port, the outlet drain port being fluidly coupled to the first fuel injector supply conduit via a drain check valve, the drain check valve being configured and arranged to effect fluid communication between the outlet drain port and the first fuel injector supply conduit only in a flow direction that extends from the outlet drain port toward the first fuel injector supply conduit.

6. The fuel supply system of claim 1, wherein the reciprocating-piston engine includes a combustion pre-chamber and a main combustion chamber, the combustion pre-chamber being fluidly coupled to the main combustion chamber, and the first fuel injector is a pre-chamber fuel injector that is fluidly coupled to the main combustion chamber via the combustion pre-chamber.

7. The fuel supply system of claim 1, wherein the reciprocating-piston engine includes an intake manifold and a main combustion chamber, the intake manifold being fluidly coupled to the main combustion chamber, and the first fuel injector is an intake fuel injector that is fluidly coupled to the main combustion chamber via the intake manifold.

8. The fuel supply system of claim 1, wherein the storage tank is configured to contemporaneously store a liquid phase of a fuel and a gaseous phase of the fuel, the liquid phase of the fuel being separated from the gaseous phase of the fuel by a free surface defined therebetween, the first aperture of the storage tank being arranged to effect fluid communication between the first aperture and the gaseous phase of the fuel along a flow path that does not include the liquid phase of the fuel, the second aperture of the storage tank being arranged to effect fluid communication between the second aperture and the liquid phase of the fuel along a flow path that does not include the gaseous phase of the fuel.

9. An engine, comprising:

a block defining a cylinder bore therethrough;

a piston disposed within the cylinder bore and configured for reciprocating motion relative to the cylinder bore, the cylinder bore and the piston at least partly defining a main combustion chamber;

an oxidizer intake conduit disposed in selective fluid communication with the main combustion chamber via an intake valve;

an intake fuel injector having at least one outlet orifice disposed in fluid communication with the main combustion chamber via the oxidizer intake conduit;

a direct fuel injector having at least one outlet orifice disposed in direct fluid communication with the main combustion chamber along a flow path that does not include the oxidizer intake conduit;

a storage tank, a wall of the storage tank defining a first aperture and a second aperture therethrough, the first aperture being distinct from the second aperture, the first aperture of the storage tank being fluidly coupled to an inlet of the intake fuel injector via a pressure control module, the pressure control module being configured to maintain a pressure at the inlet of the intake fuel injector that is less than a pressure inside the storage tank; and a pump fluidly coupled with the second aperture of the storage tank, an inlet of the direct fuel injector being fluidly coupled to an outlet of the pump, the pump being configured to maintain a pressure at the inlet of the direct fuel injector that is greater than the pressure at the inlet of the intake fuel injector.

10. The engine of claim 9, further comprising a pre-chamber assembly that includes a pre-chamber body defining a pre-chamber cavity and defining at least one orifice therethrough, the pre-chamber cavity being in fluid communication with the main combustion chamber via the at least one orifice, a pre-chamber fuel injector disposed in fluid communication with the main combustion chamber via the pre-chamber cavity, and an ignition source operatively coupled to the pre-chamber cavity.

11. The engine of claim 10, further comprising an intake throttle valve disposed in the oxidizer intake conduit, and disposed fluidly in series between an inlet to the oxidizer intake conduit and the intake valve.

12. The engine of claim 10, wherein the oxidizer intake conduit does not include an intake throttle valve disposed fluidly in series between an inlet to the oxidizer intake conduit and the intake valve.

13. The engine of claim 10, further comprising a controller being operatively coupled to the direct fuel injector, the pre-chamber fuel injector, the intake fuel injector, and the pump, the controller being configured to operate the engine in a first mode when a speed of the engine is less than a predetermined threshold speed, a load of the engine is less than a predetermined threshold load, or a temperature of the engine is less than a predetermined threshold temperature, and operate the engine in a second mode when a speed of the engine is greater than the predetermined threshold speed, the load of the engine is greater than the predetermined threshold load, or the temperature of the engine is greater than the predetermined threshold temperature, wherein according to the first mode, fuel is delivered to the pre-chamber cavity via the pre-chamber fuel injector, fuel is delivered to the oxidizer intake conduit via the intake fuel injector, and fluid communication between the direct fuel injector and the main combustion chamber is blocked, and wherein according to the second mode, fuel is delivered to the pre-chamber cavity via the pre-chamber fuel injector, and fuel is delivered to the main combustion chamber via the direct fuel injector.

14. The engine of claim 13, wherein the oxidizer intake conduit does not include an intake throttle valve disposed fluidly in series between an inlet to the oxidizer intake conduit and the intake valve, and wherein further according to the second mode, the engine is operated according to a skip-fire schedule.

15. The engine of claim 13, wherein further according to the second mode, fuel is additionally delivered to the engine via the intake fuel injector.

16. The engine of claim 9, wherein the pressure control module includes a first check valve and a second check valve,
- the first check valve being configured and arranged to effect fluid communication therethrough only along a flow direction extending from the storage tank toward the intake fuel injector,
- the second check valve being configured and arranged to effect fluid communication therethrough only along a flow direction extending from the intake fuel injector toward the storage tank.

17. The engine of claim 9, wherein the storage tank is configured to contemporaneously store a liquid phase of a fuel and a gaseous phase of the fuel, the liquid phase of the fuel being separated from the gaseous phase of the fuel by a free surface defined therebetween,
- the first aperture of the storage tank being arranged to effect fluid communication between the first aperture and the gaseous phase of the fuel along a flow path that does not include the liquid phase of the fuel,
- the second aperture of the storage tank being arranged to effect fluid communication between the second aperture and the liquid phase of the fuel along a flow path that does not include the gaseous phase of the fuel.

18. The engine of claim 17, wherein the pump is fluidly coupled to the direct fuel injector via a heat exchanger, the heat exchanger being thermally coupled to a heat source and configured to transfer heat from the heat source to a discharge flow from the pump, thereby evaporating the discharge flow from the pump via the heat exchanger.

19. A method for supplying a fuel to an engine, the method comprising:
- drawing a first flow of the fuel from a storage tank, the first flow of the fuel leaving the storage tank in a gaseous state;
- delivering the first flow of the fuel from the storage tank to a first fuel injector via a pressure control module;
- decreasing a pressure of the first flow of the fuel to less than a pressure inside the storage tank via the pressure control module;
- injecting the first flow of the fuel into a main combustion chamber of the engine via an oxidizer intake conduit of the engine;
- drawing a second flow of the fuel from the storage tank, the second flow of the fuel leaving the storage tank in a liquid state, the gaseous state of the fuel coexisting with the liquid state of the fuel within the storage tank;
- pumping the second flow of the fuel to a pressure that is higher than a pressure inside the storage tank;
- delivering the second flow of the fuel to a second fuel injector at a pressure that is higher than the pressure of the first flow of the fuel within the first fuel injector; and
- injecting the second flow of the fuel directly into the main combustion chamber of the engine via the second fuel injector.

20. The method of claim 19, further comprising:
- drawing a third flow of the fuel from the storage tank, the third flow of the fuel leaving the storage tank in the gaseous state;
- delivering the third flow of the fuel from the storage tank to a third fuel injector via the pressure control module; and
- injecting the third flow of the fuel into the main combustion chamber via a combustion pre-chamber.

* * * * *